United States Patent
Yen et al.

(10) Patent No.: US 9,261,968 B2
(45) Date of Patent: Feb. 16, 2016

(54) METHODS AND SYSTEMS FOR DYNAMIC CALIBRATION OF MOVABLE GAME CONTROLLERS

(71) Applicant: AiLive Inc., Cupertino, CA (US)

(72) Inventors: Wei Yen, Clyde Hill, WA (US); Ian Wright, Sunnyvale, CA (US); Xiaoyuan Tu, Sunnyvale, CA (US); Stuart Reynolds, San Francisco, CA (US); William Robert Powers, III, San Francisco, CA (US); Charles Musick, Vernon, CT (US); John Funge, Sunnyvale, CA (US); Daniel Dobson, Atherton, CA (US); Curt Bererton, San Francisco, CA (US)

(73) Assignee: AiLive, Inc., Mountain View, CA (US)

( * ) Notice: Subject to any disclaimer, the term of this patent is extended or adjusted under 35 U.S.C. 154(b) by 85 days.

(21) Appl. No.: 14/055,594

(22) Filed: Oct. 16, 2013

(65) Prior Publication Data
US 2014/0092009 A1  Apr. 3, 2014

Related U.S. Application Data

(63) Continuation of application No. 12/020,431, filed on Jan. 25, 2008, and a continuation-in-part of application No. 11/820,207, filed on Jun. 18, 2007, now Pat. No. 7,636,645, and a continuation-in-part of application (Continued)

(51) Int. Cl.
*G06F 3/01* (2006.01)
*A63F 13/211* (2014.01)

(Continued)

(52) U.S. Cl.
CPC .............. *G06F 3/017* (2013.01); *A63F 13/06* (2013.01); *A63F 13/10* (2013.01); *A63F 13/211* (2014.09);

(Continued)

(58) Field of Classification Search
CPC ......... A63F 13/02; A63F 13/04; A63F 13/06; A63F 13/20; A63F 13/428; G06F 3/0346
See application file for complete search history.

(56) References Cited

U.S. PATENT DOCUMENTS 5,383,363 A * 1/1995 Kulmaczewski ............... 73/510
6,249,606 B1  6/2001 Kiraly et al.

(Continued)

FOREIGN PATENT DOCUMENTS

| CN | 1942924 A | 4/2007 |
| EP | 1834680 A2 | 9/2007 |

(Continued)

OTHER PUBLICATIONS

U.S. Appl. No. 10/769,484, filed Aug. 4, 2005, Carl.

(Continued)

*Primary Examiner* — Lawrence Galka
(74) *Attorney, Agent, or Firm* — Silicon Edge Law Group LLP; Arthur J. Behiel

(57) ABSTRACT

A video gaming system includes a wireless controller that senses linear and angular acceleration to calculate paths of controller movement over a broad range of controller motion. The system also includes an electromagnetic alignment element, such as a set of LEDS. The controller includes an additional sensor to sense light from the LEDs over a relatively restricted range of controller motion, and use this sensed light to dynamically calibrate the controller when the controller passes through the restricted range of motion over which the sensor senses the light.

17 Claims, 13 Drawing Sheets

Overview.

Related U.S. Application Data

No. 11/486,997, filed on Jul. 14, 2006, now Pat. No. 7,702,608.

(60) Provisional application No. 60/990,898, filed on Nov. 28, 2007.

(51) Int. Cl.
*A63F 13/428* (2014.01)
*A63F 13/20* (2014.01)
*A63F 13/40* (2014.01)
*G06F 3/0346* (2013.01)

(52) U.S. Cl.
CPC ............ *A63F 13/428* (2014.09); *G06F 3/0346* (2013.01); *A63F 2300/105* (2013.01); *A63F 2300/1043* (2013.01); *A63F 2300/6045* (2013.01)

(56) References Cited

U.S. PATENT DOCUMENTS

| | | | |
|---|---|---|---|
| 7,023,536 | B2 | 4/2006 | Zhang et al. |
| 7,030,856 | B2 | 4/2006 | Dawson et al. |
| 7,038,846 | B2 | 5/2006 | Mandella |
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl |
| 7,268,956 | B2 | 9/2007 | Mandella |
| 7,421,369 | B2 | 9/2008 | Clarkson |
| 7,474,809 | B2 | 1/2009 | Carl |
| 7,519,223 | B2 | 4/2009 | Dehlin et al. |
| 7,580,572 | B2 | 8/2009 | Bang et al. |
| 7,690,994 | B2* | 4/2010 | Dohta ............................ 463/37 |
| 7,702,608 | B1 | 4/2010 | Bererton et al. |
| 7,729,515 | B2 | 6/2010 | Mandella et al. |
| 7,770,136 | B2 | 8/2010 | Beeck et al. |
| 7,774,155 | B2 | 8/2010 | Sato et al. |
| 7,826,641 | B2 | 11/2010 | Mandella et al. |
| 7,961,909 | B2 | 6/2011 | Mandella et al. |
| 8,477,097 | B2 | 7/2013 | Dawson et al. |
| 2003/0023192 | A1* | 1/2003 | Foxlin ............................ 600/595 |
| 2004/0030531 | A1 | 2/2004 | Miller et al. |
| 2004/0070564 | A1 | 4/2004 | Dawson et al. |
| 2005/0174324 | A1 | 8/2005 | Liberty et al. |
| 2005/0212766 | A1 | 9/2005 | Reinhardt et al. |
| 2005/0215322 | A1 | 9/2005 | Himoto et al. |
| 2005/0219213 | A1 | 10/2005 | Cho et al. |
| 2005/0253806 | A1* | 11/2005 | Liberty et al. ................ 345/156 |
| 2006/0071904 | A1 | 4/2006 | Cho et al. |
| 2006/0139327 | A1 | 6/2006 | Dawson et al. |
| 2006/0252541 | A1* | 11/2006 | Zalewski et al. ................ 463/36 |
| 2006/0258454 | A1 | 11/2006 | Brick |
| 2006/0279542 | A1 | 12/2006 | Flack et al. |
| 2006/0279549 | A1 | 12/2006 | Zhang et al. |
| 2006/0287084 | A1 | 12/2006 | Mao et al. |
| 2006/0287085 | A1 | 12/2006 | Mao et al. |
| 2007/0060385 | A1* | 3/2007 | Dohta ............................ 463/43 |
| 2007/0081695 | A1* | 4/2007 | Foxlin et al. .................. 382/103 |
| 2007/0219744 | A1 | 9/2007 | Kolen |
| 2009/0066641 | A1 | 3/2009 | Mahajan et al. |
| 2009/0143141 | A1 | 6/2009 | Wells et al. |
| 2009/0149257 | A1 | 6/2009 | Ferguson et al. |
| 2009/0209343 | A1 | 8/2009 | Foxlin et al. |
| 2009/0258703 | A1 | 10/2009 | Brunstetter |
| 2009/0265671 | A1 | 10/2009 | Sachs et al. |
| 2009/0273559 | A1 | 11/2009 | Rofougaran et al. |
| 2009/0278791 | A1* | 11/2009 | Slycke et al. ................ 345/156 |
| 2009/0291759 | A1 | 11/2009 | Cox et al. |
| 2010/0035688 | A1 | 2/2010 | Picunko |
| 2010/0079447 | A1 | 4/2010 | Williams |
| 2010/0088061 | A1 | 4/2010 | Horodezky et al. |
| 2010/0117959 | A1 | 5/2010 | Hong et al. |
| 2010/0171696 | A1 | 7/2010 | Wu |
| 2010/0201616 | A1 | 8/2010 | Choi et al. |

FOREIGN PATENT DOCUMENTS

| | | |
|---|---|---|
| EP | 2090346 A1 | 8/2009 |
| GB | 2423808 | 9/2006 |
| JP | 11253656 | 9/1999 |
| JP | 2007-083013 | 4/2007 |
| TW | 200538751 | 4/2004 |
| TW | 200639406 | 5/2005 |
| TW | 200722159 | 12/2005 |
| WO | WO2006/090197 | 8/2006 |
| WO | WO2006090197 | 8/2006 |
| WO | WO2006/128093 | 11/2006 |
| WO | WO2006128093 | 11/2006 |

OTHER PUBLICATIONS

U.S. Appl. No. 13/134,006, filed Sep. 22, 2011, Manetalla et al.
U.S. Appl. No. 13/199,239, filed Feb. 16, 2012, Manetalla et al.
Keogh and Pazzani, Derivative Dynamic Time Warping, in First SIAM International Conference on Data Mining (Chicago, IL, 2001).
Rabiner, Lawrence, "A Tutorial on Hidden Markov Models and Selected Applications in Speech Recognition." Proceedings of the IEEE, 77 (2), p. 257-286, Feb. 1989.
Titterton and Weston, "Radar, Sonar, Navigation & Avionics Strapdown Inertial Navigation Technology, 2nd Edition," Insitution of Electrical Engineers, 2004, pp. 21-27.
Chin-Woo Tan et al., "Design and Error Analysis of Accelerometer-Based Inertial Navigation Systems" (Jun. 1, 2002, Institute of Transportation Studies, UC Berkeley).
Kjeldson and Kender, Toward the Use of Gesture in Traditional User Interfaces, Proceedings of the 2nd International Conference on Automatic Face and Gesture Recognition, 1996.
Kwon and Gross, Combining Body Sensors and Visual Sensors for Motion Training, ACM SIGCHI ACE 2005.
Liqun Deng et al, "Automated Recognition of Sequential Patterns in Captured Motion Streams", WAIM 2010, LNCS 6184, pp. 250-261, 2010.
Roth and Tanaka, "Computer Vision for Interactive Computer Graphics", TR99-02 Jan. 1999, IEEE Computer Graphics and Applications, May-Jun. 1998, pp. 42-53.
Jung et al, "Gesture recognition based on motion inertial sensors for ubiquitous interactive game content", IETE Technical review, vol. 27, Issue 2, Mar.-Apr. 2010.
Zhang Xu et al, "Hand Gesture Recognition and Virtual Game Control Based on 3D Accelerometer and EMG Sensors", IUI'09, Feb. 8-11, 2009, Sanibel Island, Florida, USA.
Welch et al, "Motion Tracking: No Silver Bullet, but a Respectable Arsenal", Motion Tracking Survey,Nov./Dec. 2002.
Mulder, Alex "Human movement tracking technology," Simon Fraser University, Jul. 1994.
Kratz et al, "Gesture Recognition Using Motion Estimation on Mobile Phones" 3rd Intl Workshop on Pervasive Mobile Interaction Devices, 2007.
Blanchard et al, "Reality Built for Two: A Virtual Reality Tool" I3D '90 Proceedings of the 1990 symposium on Interactive 3D graphics, pp. 35-36.
Kim et al "Gesture Recognition Based on Neural Networks for Dance Game Contents", 2009 International Conference on New Trends in Information and Service Science.
Zhou et al "Real-time Facial Expression Recognition in the Interactive Game Based on Embedded Hidden Markov Model" (CGIV 2004).
Foley et al., "Computer Graphics, Principles and Practice" (2nd Ed., 1990, Addison-Wesley Publishing Company Inc., pp. 701-717).

* cited by examiner

Composite controller made by attaching a motion sensing dongle to a motion sensing game controller Composite controller made up from multiple motion sensing game controllers.

Composite controller made up from multiple motion sensing game controllers.

Motion sensing controller capable of tracking relative angular and linear motion.

Interactive

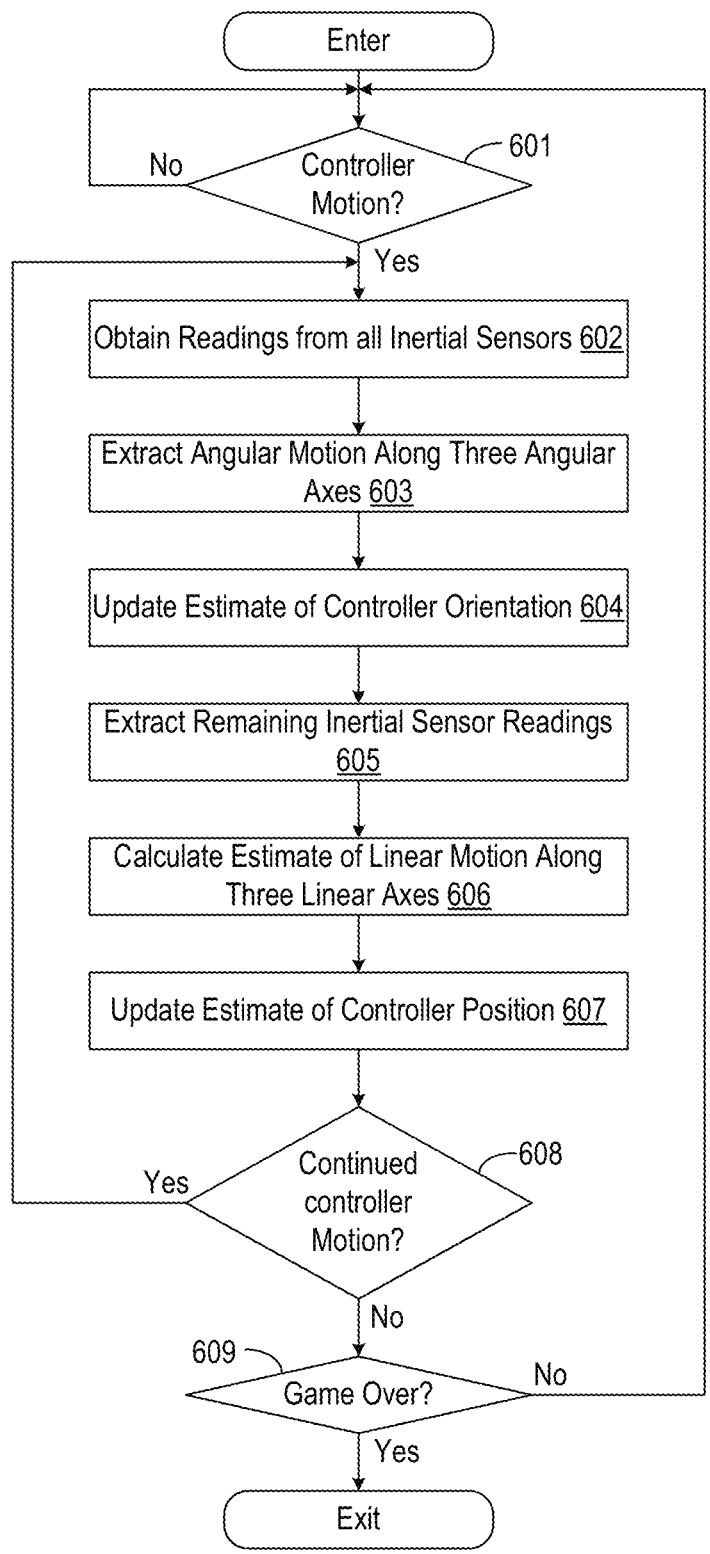
FIG. 6: Flow Diagram.

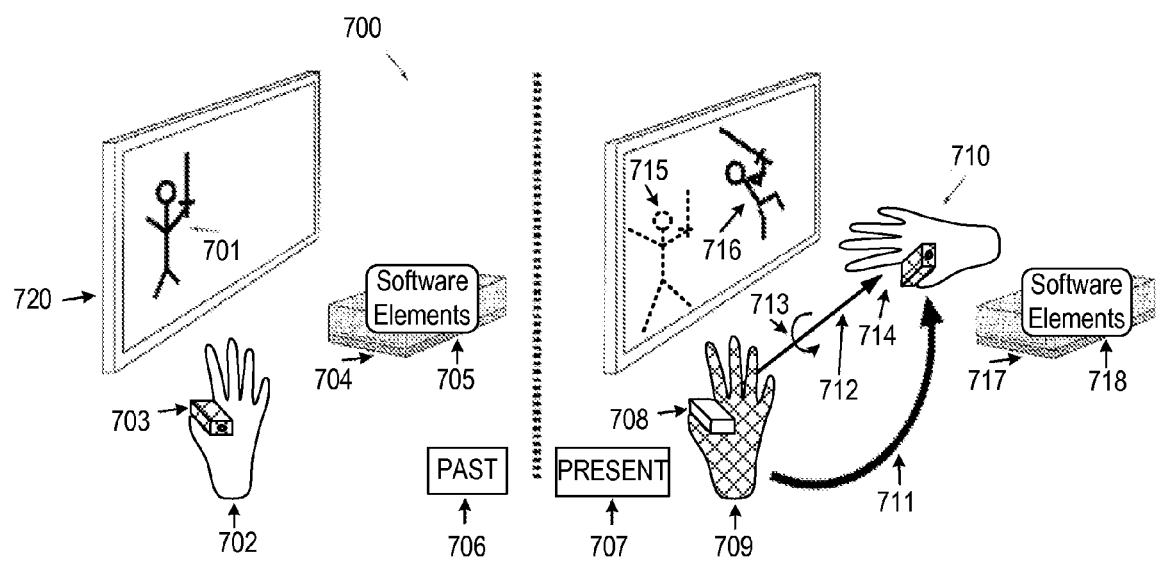
FIG. 7: Overview.

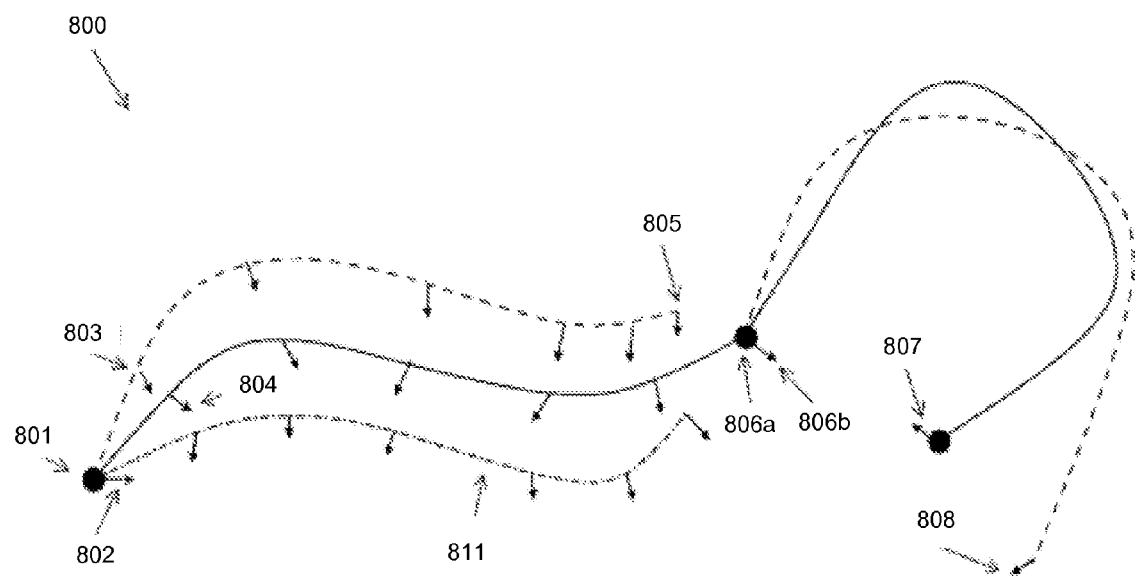
FIG. 8: Backfitting.

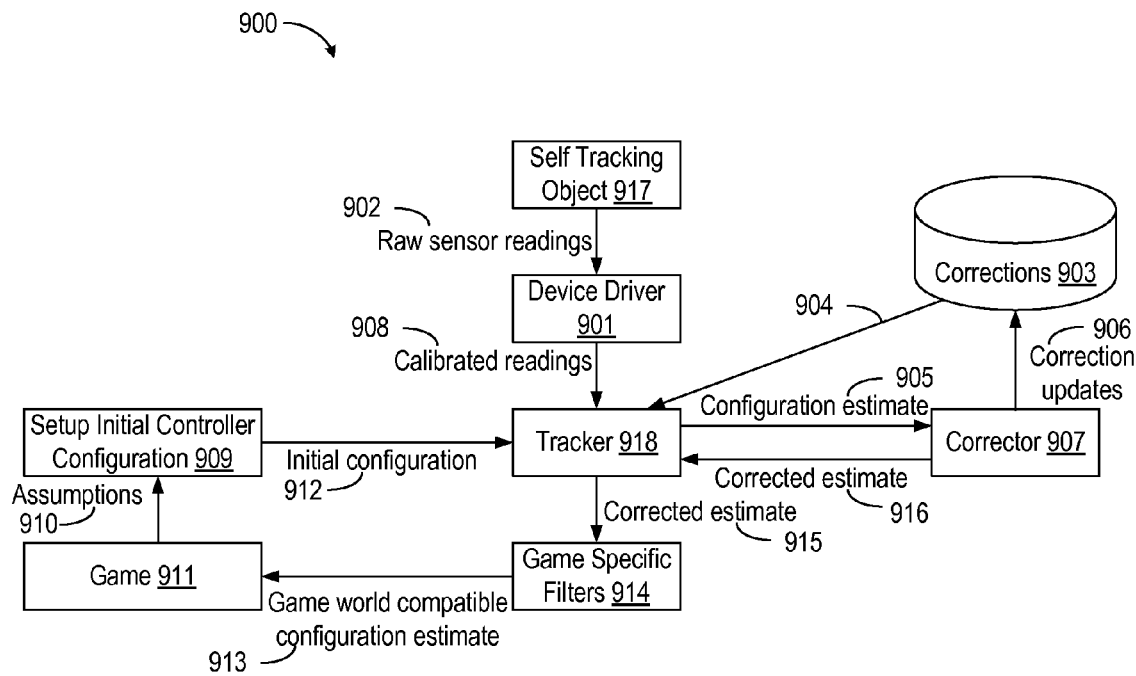
FIG. 9: Data flow.

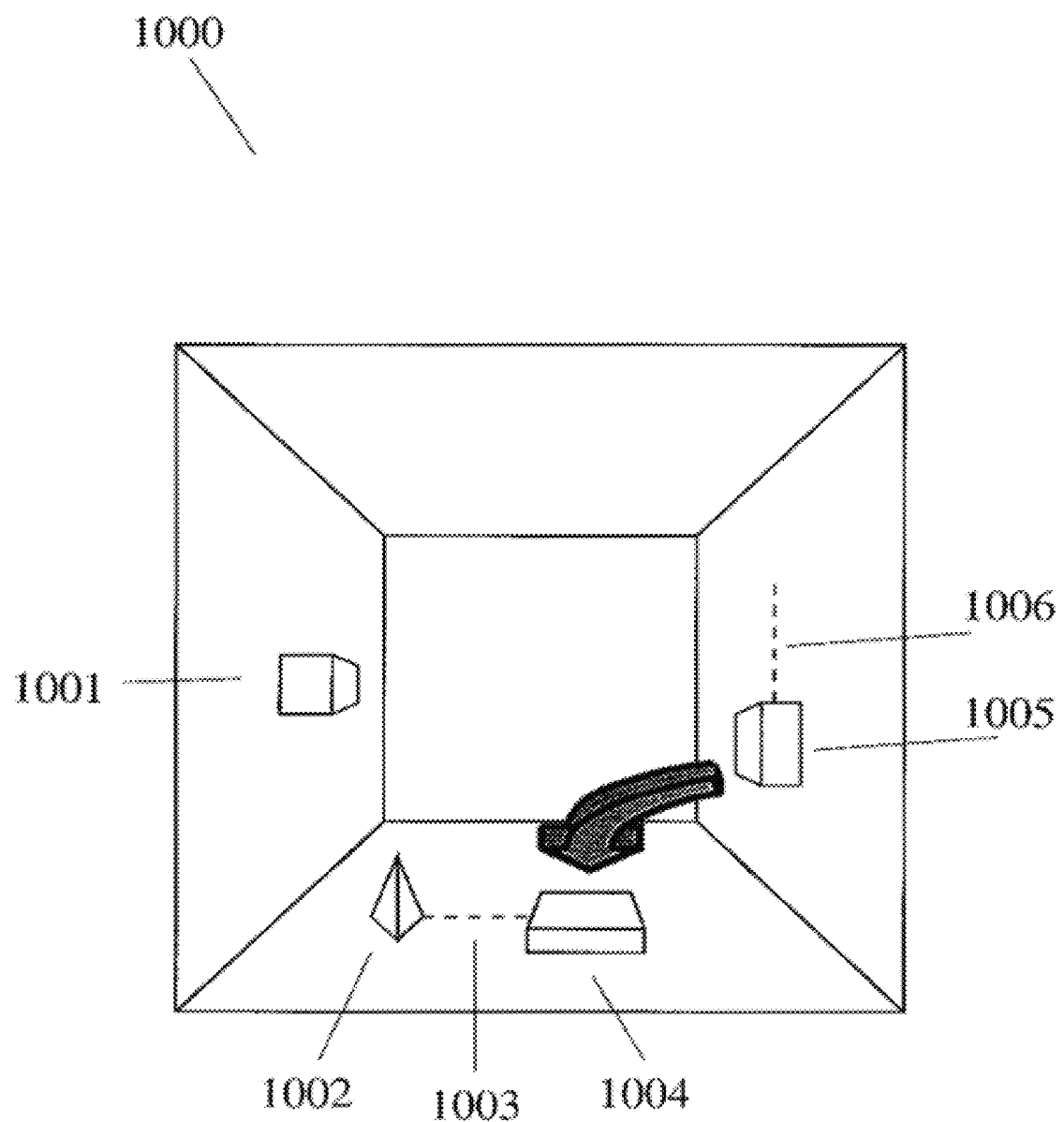
FIG. 10: Selecting objects.

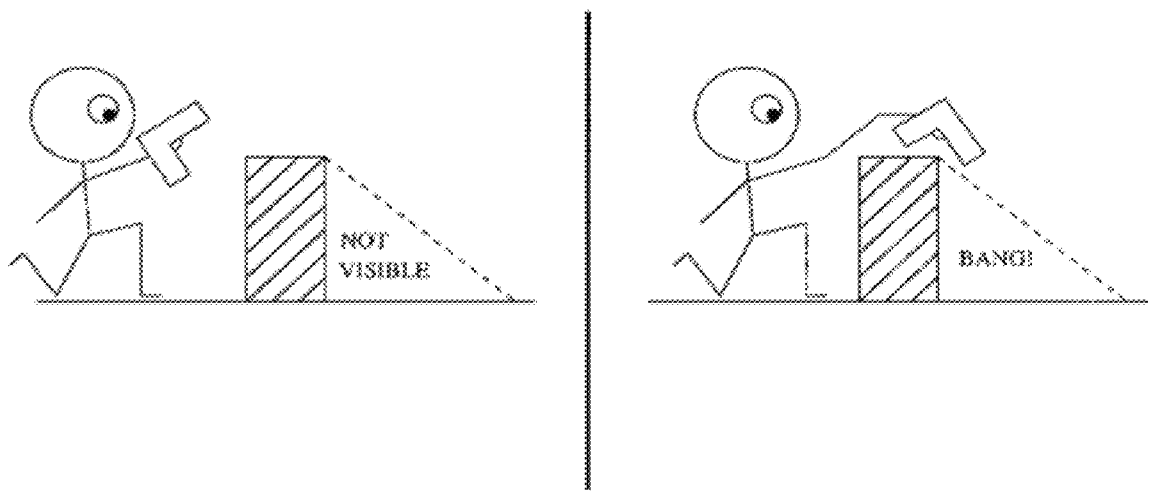
FIG. 11: Shooting over objects without looking.

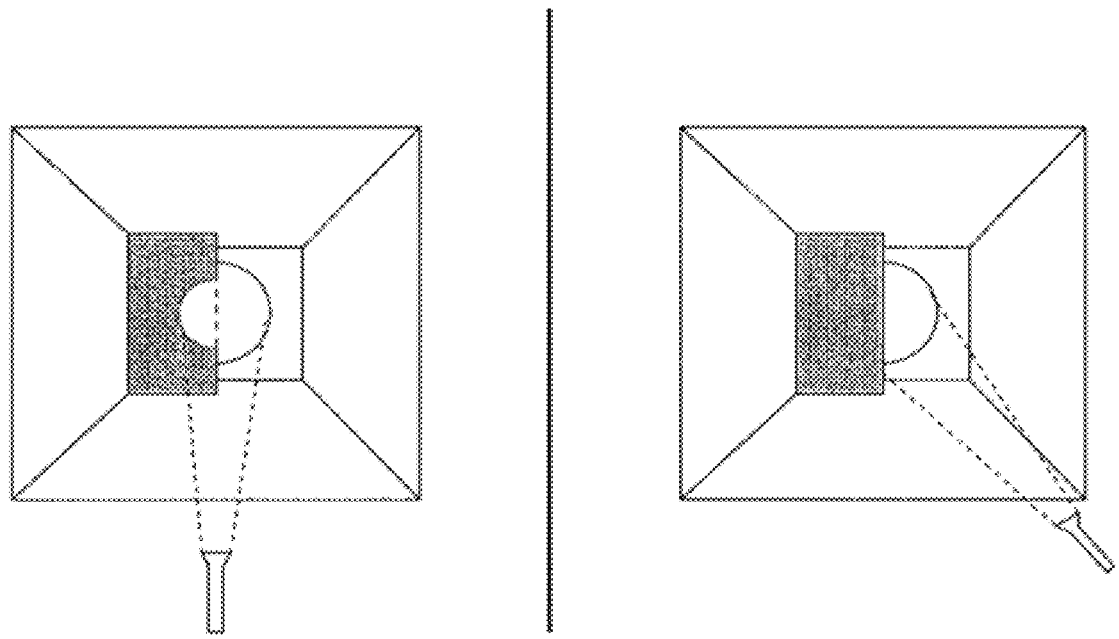
FIG. 12: Illuminating behind objects without looking.

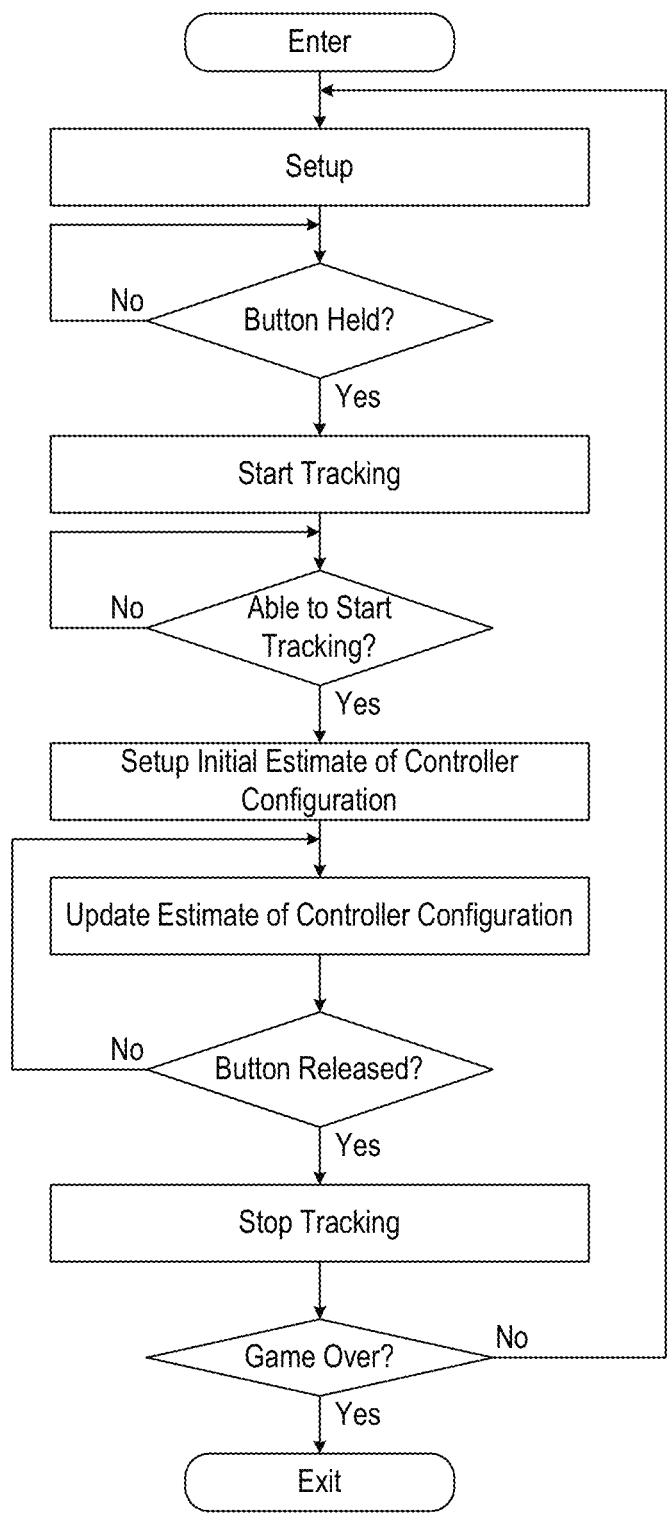
FIG. 13: Control flow.

METHODS AND SYSTEMS FOR DYNAMIC CALIBRATION OF MOVABLE GAME CONTROLLERS

BACKGROUND

1. Field of Invention

The present invention relates to self-contained inertial navigation systems (INS) for interactive control using movable controllers in applications like computer display games.

2. Related Art

The Nintendo Wii Remote™ wireless controller is an example of the most recent state of the art advances in user interactive controllers for computer display game systems. It is a movable wireless remote controller, which is hand-held by the interactive user, that transmits input data to the computer controlled game display system via conventional short range wireless RF transmissions e.g., a Bluetooth™ system, and receives data via infra-red light sensors. This game controller is described in detail in Published U.S. Application US2007/0060384, (Mar. 15, 2007).

With movable controllers for game systems like the Nintendo Wii, it is desirable to use a self-contained INS system to sense and track the relative linear and angular motion of the movable controller. Current state of the art movable controllers do not have this ability. For example, the Wii Remote can use data it receives via its infra-red light sensors to infer information about its position and orientation from a set of external infra-red light sources that have been placed in the environment in some known configuration. But the use of light sensors means that the device depends on the light sources and is not, therefore, self-contained. The use of external signal sources is burdensome because the user must set up and configure those external sources. Furthermore, the user must restrict movements made with the controller so as to keep those external sources in view. A self-contained system has no such restriction on movement and requires no setup or configuration of external sources by the user.

Self-contained INS systems typically use sensors like accelerometers and gyroscopes. State of the art movable controllers like the Wii Remote use a tri-axial accelerometer. However, a single tri-axial accelerometer is insufficient to calculate all six degrees of freedom required to infer the linear and angular motion of a movable controller. In fact, it is impossible to even determine whether the controller is being translated or rotated, since a fixed rotation and a linear acceleration could generate the same set of readings on a single tri-axial accelerometer. However, by making assumptions on how the controller is held and along which axis it will be moved, it is sometimes possible to track the relative linear and angular motion. For example, in state of the art games for the Nintendo Wii, players are instructed on how to hold and move their controller. By assuming the players are approximately following the instructions, it is possible to interpret the signal from the tri-axial accelerometer to roughly track the relative linear and angular motion of the controller. But there is a wide class of games and other applications where it is undesirable to constrain how the user may move or hold the movable controller. State of the art movable controllers are therefore unnecessarily limiting.

To review the background of sensing the positions and tracking the paths of objects moving through three dimensional space, the tracking is done by inertial navigation systems (INS) which use a combination of accelerometers and gyroscopes to create or compute an inertial frame within which accelerations represent strictly linear acceleration in the world frame. If you know the world frame linear acceleration of an object over time, you can calculate the current position of that object over time with respect to its starting location. If you know the angular velocities of an object over time, you can provide it's orientation at any point in time. Conventionally, in the tracking of objects, linear accelerations combined with angular velocities are necessary and sufficient for providing location and orientation of an object with respect to a starting location. There are six unknowns that must be solved for at every point in time. Most INS use gyroscopes to fix or solve for the three angular velocities. Once the orientation over time is known, accelerometers can be used to track the three linear accelerations as described above. Reference is made to the publication, *Radar, Sonar, Navigation & Avionics Strapdown Inertial Navigation Technology*, $2^{nd}$ *Edition*, D. Titterton and J. Weston, published in 2005 as part of the IEE Radar, Sonar, Navigation and Avionics Series, for an introduction to and further information on the field of inertial navigation systems.

Reference is made to the publication, *Design and Error Analysis of Accelerometer-Based Inertial Navigation Systems*, Chin-Woo Tan et al., Published in June, 2002 by the University of California at Berkeley for the State of California PATH Transit and Highway System which is hereby incorporated by reference. This is a study of the feasibility of inertial navigation systems that use only accelerometers to compute the linear and angular motions of a rigid body. This publication relates to systems for measuring linear and angular velocities of motor vehicles and the like. Its determinations track motion on scale of tens of meters accuracy on a time scale of tens of minutes.

SUMMARY OF THE INVENTION

The present invention provides a self-contained INS for interactive control using movable controllers. In the preferred embodiment a movable controller provides interactive control over some aspect of a computer display game system by tracking the relative linear and angular motion of the moving controller.

In one embodiment, the present invention involves incorporating a plurality of self-contained inertial sensors into a movable controller, and correlating the motion sensed by each sensor, so that both the three-dimensional linear path and the angular orientation of the moving controller may be accurately tracked. For best results, the plurality of self-contained inertial sensors must be capable of tracking along six axes: three for linear acceleration along the three linear axes, and three axes for determining angular motion. Thus, the combination of one tri-axial accelerometer and one tri-axial gyroscope in the movable controller will function very effectively. However, those skilled in the art will be aware that various other combinations of sensors will also function effectively. For example, six accelerometers can be arranged in a known layout to provide an effective INS for interactive control using a movable controller.

In one embodiment of the present invention, existing game controllers having self-contained inertial sensors that sense motion along less than six axes, e.g. a tri-axial accelerometer, may be enhanced by additional self-contained inertial sensors removably attached to the game controller to provide a composite game controller. Such a composite game controller would be capable of sensing the linear and angular motion of the composite controller. The composite controller would comprise the combination of at least one controller containing self-contained inertial sensors for sensing the linear/angular motion of the moving controller; one or more self-contained inertial sensors, removably attached to the controller at a fixed linear position and orientation with respect to the controller, for further sensing the linear and angular motion of the moving controller; and apparatus for correlating the motion sensed by each of said controller sensors and separate sensors. In such a composite controller, the combined sensors should provide motion sensing along all six axes. For example, if the conventional game controller has a tri-axial accelerometer, then the attached set of sensors could include one tri-axial gyroscope or a plurality of attached gyroscopes providing at least combined tri-axial sensing. The attached sensors should be mounted on the controller in a known position with respect to the conventional game controller.

If the composite controller still does not provide sensing along all six axes it may still be more useful than the basic controller. In particular, the constraints under which the user may hold and move the controller might be able to be relaxed without damaging the ability to track the composite controller's linear and angular motion.

In one embodiment of the invention, the attached sensors may be one or more other controllers that are attached to the basic controller. A separate device may be provided so that the controllers can be attached in some known configuration. Alternatively, appropriate banding may be used for attachment. In such case that the banding does not result in precisely known relative positions and orientations of all the controllers to one another, a separate calibration phase may be required.

In one embodiment, a device with one or more self-contained inertial sensors may be attached to a basic conventional controller that is incapable of tracking linear and angular motion of the basic controller to convert the composite controller into one which tracks both angular and linear motion. With a conventional Wii Remote controller, the removably attached sensors are in the form of a dongle that may be inserted into a port in the conventional basic controller.

As will be subsequently described, the above described invention may be implemented as a method for dynamically determining the linear and angular motion of a movable game controller, and as a computer program for dynamically determining the linear and angular motion of a movable controller.

In accordance with another aspect of the invention, a computer game system is provided in which aspects of the game are controlled by the above defined movable controllers having apparatus for determining their linear and angular motion. For example, a game might interpret the motion of the controller to drive the animation of a sword on the game display such that the sword on the display moves in an ostensibly similar manner to the motion of the controller. Since a self-contained INS can only track motion relative to the position and orientation of the controller when tracking began, the game may assume the controller was held in some initial starting position and orientation. In which case, the motion applied to the on screen object being controlled will only be correct with respect to this assumption about the initial starting position and orientation. Additional sensors, possibly not self-contained, and techniques could be used to more accurately determine the starting position and orientation.

This brief summary has been provided so that the nature of the invention may be understood quickly. A more complete understanding of the invention may be obtained by reference to the following description of the preferred embodiments thereof in connection with the attached drawings.

BRIEF DESCRIPTION OF THE FIGURES

FIG. 6 is a generalized flowchart of the programming in the operation of the invention with a controller for a computer controlled game display.

FIG. 7 shows and overview of one way of using the software elements in one embodiment.

FIG. 8 shows a 2-dimensional representation of a backfitting algorithm, as used in one embodiment.

FIG. 9 shows a data-flow diagram of information flow in a game control system.

FIG. 10 shows an example of selecting objects in a possibly-fictional game world.

FIG. 11 shows an example of shooting over objects without looking, in a possibly-fictional game world.

FIG. 12 shows an example of illuminating behind objects without looking, in a possibly-fictional game world.

FIG. 13 shows a process flow diagram in one embodiment.

DETAILED DESCRIPTION OF THE INVENTION

1. Definitions

Figure 1:
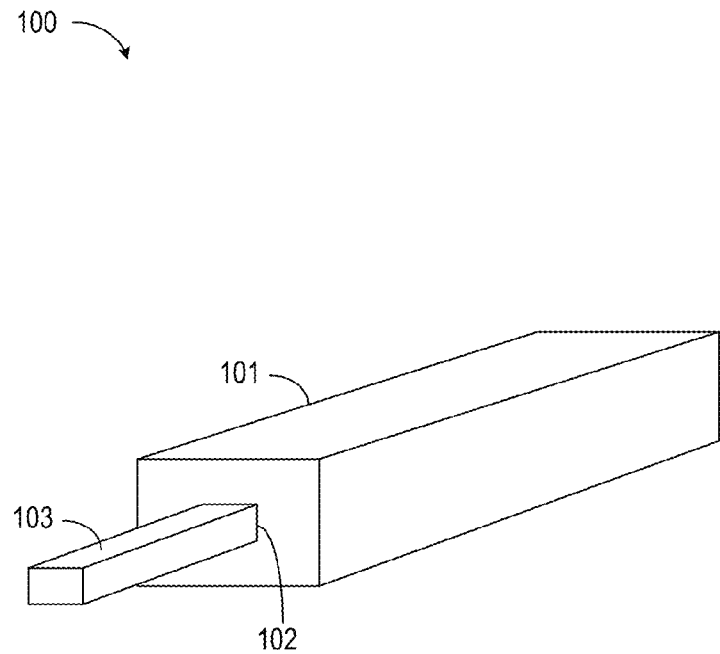
FIG. 1 shows an illustrative embodiment in which two motion sensing game controllers or like housings including self-contained inertial sensors may be detachably attached by a dongle attachment to provide a game controller in accordance with the invention.

In the description of the invention herein, above and hereinafter, the following definitions are offered to clarify the terminology used:

Self-contained inertial sensor: a device that requires no external signal sources to be placed in the environment for measuring acceleration of a moving body along one or more axes of the six possible linear and angular axes. Unless stated otherwise, the word sensor is understood to refer to a self-contained inertial sensor. For illustrative purposes, in this document, we describe instantiations using accelerometers and gyroscopes. However, those skilled in the art would immediately recognize that other devices could be used as self-contained inertial sensors. For example, a camera that compares images over time (such as the camera used in an optical mouse) could be used as a self-contained inertial sensor. But an infrared camera that is designed to work by tracking infrared sources or markers that have been deliberately placed in the environment is not an example of a self-contained inertial sensor.

Accelerometer: a device for measuring acceleration along one or more axes at a point on a moving body. An accelerometer is an example of a self-contained inertial sensor. The device can be from one to tri-axial dependent upon the number of axes it measures at a given location. For example, a tri-axial accelerometer measures acceleration along three axes at the point where the accelerometer is located. A rigid-body can move independently in any of six possible degrees of freedom, three linear and three rotational. Therefore, without additional assumptions about constraints on the motion path, a single accelerometer can never be sufficient to determine the linear and angular motion of a rigid body to which it is attached. Moreover, without making additional assumptions about constraints on the motion path, a single (even tri-axial) accelerometer cannot even determine the motion of the rigid body it is attached to along a single degree of freedom. That is because, without additional information, there is no way to know whether the source of the accelerations it is experiencing are from linear or from angular motion of the rigid body to which it is attached. However, readings from a set of accelerometers placed at different points on a rigid body in some suitable configuration can be processed to determine the linear and angular motion of the rigid body along all six degrees of freedom. Note that, even at rest, an accelerometer is responsive to the Earth's, or any other large enough object's, gravitational field.

Gyroscope: a device for measuring angular velocity around one or more axes at a point on a rotating object. A gyroscope is an example of a self-contained inertial sensor. The device can be from one to tri-axial dependent upon the number of axes it measures at a given location. For example, a tri-axial gyroscope measures angular velocity around three axes at the point where the gyroscope is located. While a tri-axial gyroscope is sufficient to track a rigid body's orientation over time, it provides no information with respect to linear movements of the body in space.

Controller: a movable game controller, preferably but not necessarily wireless and hand-held, with one or more self-contained motion sensors included in the controller, and providing output data to control an associated interactive application such as a computer game.

Basic Controller: A controller, as defined above, lacking sufficient self-contained inertial sensors to track linear and angular motion in all six degrees of freedom.

Composite Controller: A controller, in accordance with this invention in which another controller or device containing self-contained inertial sensors has been attached to a basic controller to enhance the motion sensing capability of the basic controller.

Self-tracking Object: A self-tracking object is an object that contains self-contained inertial sensors that produce a time series that is sufficient to track changes in position and orientation of that object. A composite controller is one example of an object that could be a self-tracking object.

2. Description

Figure 2:
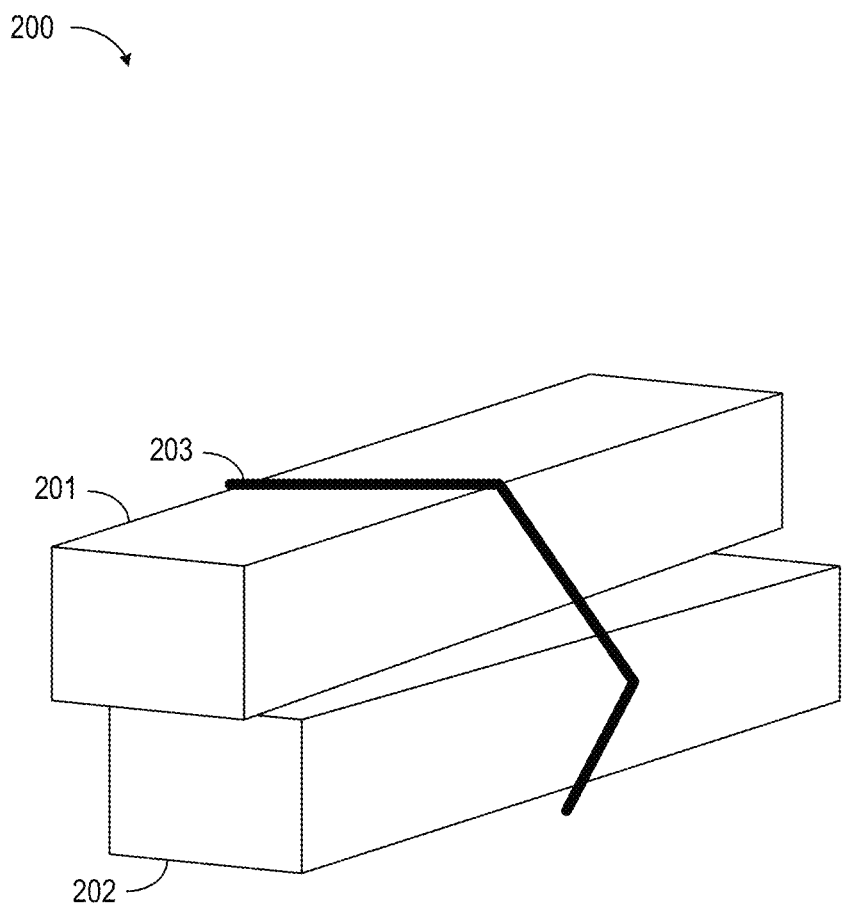
FIG. 2 shows another illustrative embodiment in which two motion sensing game controllers or like housings including self-contained inertial sensors may be detachably attached to provide a composite game controller in accordance with the invention.
Figure 3:
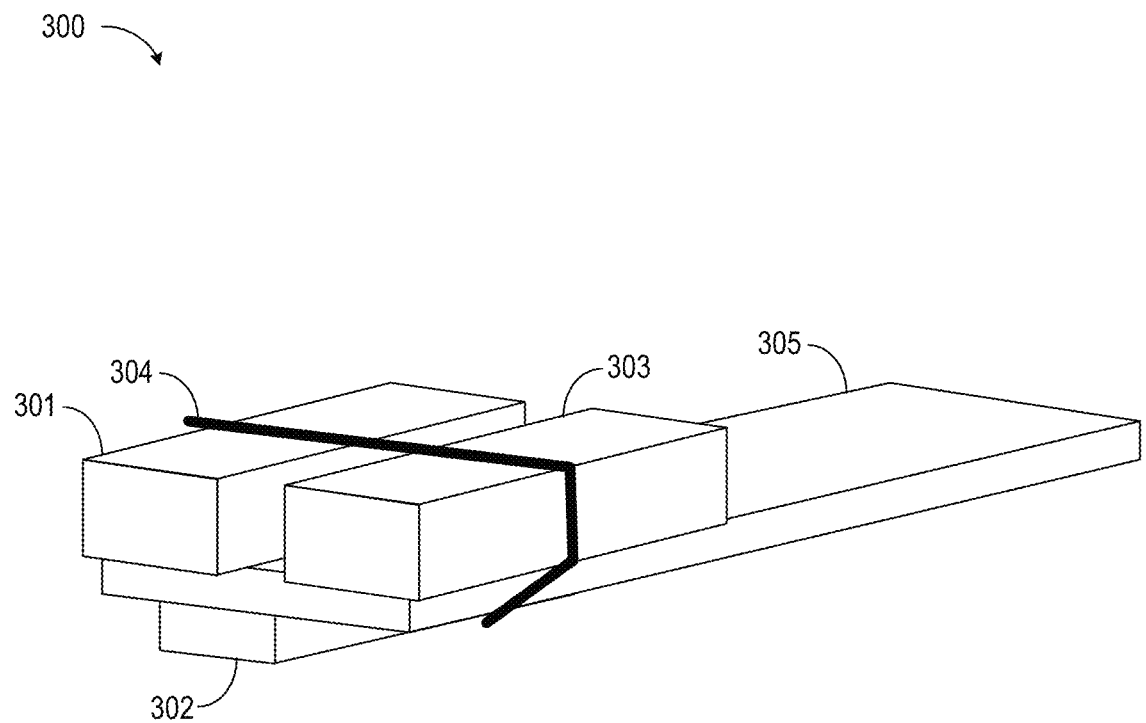
FIG. 3 shows a further illustrative embodiment in which three motion sensing game controllers or like housings including self-contained inertial sensors may be detachably mounted on a substrate to provide a game controller in accordance with the invention.

Several embodiments of the invention will be described in detail. FIGS. 1-3 each depict one of several possible embodiments of a composite game controller in which a unitary output from the composite game controller representative of the linear and angular motion of the moving composite controller must be provided.

With reference to FIG. 1, a composite controller is constructed using a dongle connection. In particular, the ancillary controller or housing containing the ancillary self-contained inertial sensors 103 is received in the port 102 of the basic game controller 101. In such a linkage, the outputs from the self-contained inertial sensors in the dongle 103 may be combined with the output of the self-contained inertial sensor in controller 101 by the data processing unit in controller 101 to provide the combined output of the whole composite controller. For best results, the combined sensing in all of the self-contained inertial sensors in the composite controller should provide for motion sensing along six axes: three linearly independent axes for the sensing of the linear motion of the moving composite controller relative to the three linear axes, and three linearly independent axes for sensing the three dimensional angular movement. Thus, if the basic controller 101 has a tri-axial accelerometer, the dongle 103 should include self-contained inertial sensors, that when combined with the tri-axial accelerometer in the basic controller, provide for the sensing of motion in all six degrees of freedom.

With respect to FIG. 2, a component 202 may be banded in a fixed position and orientation to a basic controller 201 by strap 203. In the rudimentary illustration of the embodiment, two game controllers are banded together. However, component 202 may also be an appropriate self-contained inertial sensor mounted in a housing supporting the self-contained inertial sensor. Where the basic controller 201 has a conventional tri-axial accelerometer, component 202 should include enough additional self-contained inertial sensors so that the combined output of the tri-axial accelerometer and the additional sensors is sufficient to track all six degrees of freedom. Here again, irrespective of the sensor housing, there must be an implementation in either hardware or software for combining the outputs of the plurality of self-contained inertial sensors forming the composite game controller so as to provide a unitary output from the composite game controller representative of the linear and angular motion of the moving composite controller.

With reference to FIG. 3, another rudimentary illustration similar to FIG. 2 is shown. A basic controller 301 is mounted on a rigid planar supporting substrate 305. For the purpose of this illustrative embodiment, two additional components 302 and 303 are also mounted on the substrate 305. Each of the components provides at least one self-contained inertial sensor. It should be noted that for convenience in illustration for the rudimentary embodiment of FIG. 3, three game controllers which include self-contained inertial sensors are banded together by band 304 in fixed positions and orientation with respect to one another, the two self-contained inertial sensor containing components 302 and 303, banded to controller 301, need not be controllers. Components 302 and 303 may be appropriate self-contained inertial sensors mounted in housings supporting the self-contained inertial sensors. Whether the ancillary components 302 and 303 are controllers or just the necessary self-contained inertial sensors, there must be an implementation for combining the outputs of the plurality of self-contained inertial sensors forming the composite game controller so as to provide a unitary output from the composite game controller representative of the linear and angular motion of the moving composite controller.

In each of the composite controllers depicted in FIGS. 1-3, there may be provided some form of data transmission channel between the attached self-contained inertial sensor component and the basic controller. A conventional short range wireless RF transmissions e.g., a Bluetooth™ system, may be used for example to transmit data from attached component 202 to the basic controller 201 wherein the outputs could be correlated. Alternatively, the data representative of the angular and/or linear motion of each of components 201 and 202 could be wirelessly transmitted to the computer controlled game display, and correlated by the game display computer to provide the angular and linear motion of the composite controller required for playing the computer game.

Figure 4:
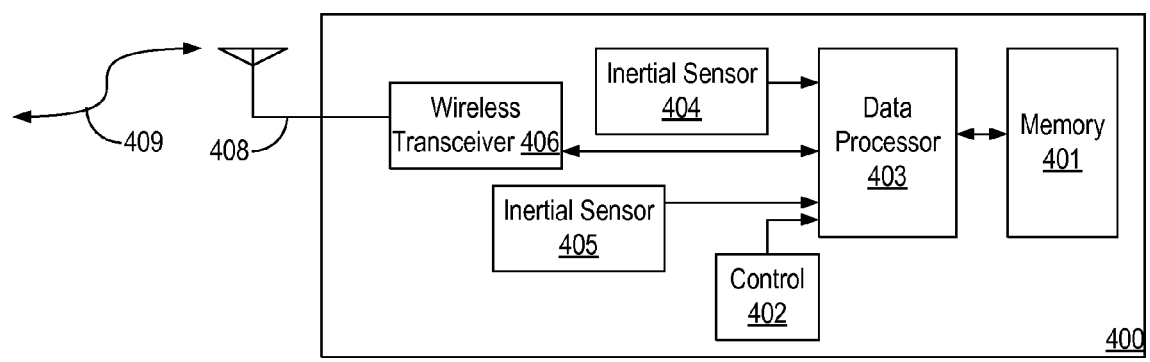
FIG. 4 is a generalized illustrative representation of the apparatus in a game controller in accordance with the present invention.

In accordance with a broad aspect of the present invention, as illustrated in FIG. 4, all of the self-contained inertial sensors needed to provide the sensing along six axes, needed to practice the present invention, may be built into one game controller.

As set forth herein above, the combined self-contained inertial sensors must provide for sensing the total of three linear and three angular axes in order to track unconstrained motion by the user. This requirement may be satisfied in a variety of ways. In particular, any combination of accelerometers and gyroscopes providing readings on at least six distinct axes with at most three gyroscopes will be sufficient if positioned appropriately. When using one tri-axial accelerometer and one tri-axial gyroscope, the sensors may be placed in any known relation to one another. When less than three readings of angular velocity are present, the location and orientation of the combined self-contained inertial sensors with respect to each other is important in order to provide a feasible operative embodiment. Although many combinations of such locations and orientations would be feasible for any given set of self-contained inertial sensors, reference may be made to the above referenced publication, *Design and Error Analysis of Accelerometer-Based Inertial Navigation Systems*, Chin-Woo Tan et al., Published in June, 2002 by the University of California at Berkeley for the State of California PATH Transit and Highway System, for determining such feasible combinations when using accelerometers.

Considering now the correlation of the mounted self-contained inertial sensors, in any of FIGS. 1-3, wherein each of the three embodiments may be considered to be a wireless composite game controller, the result is a system that includes a self-contained inertial sensor and programming routines that can convert acceleration and angular velocity data recorded by the device at each time t into the information sufficient to compute a new location and orientation of the device in the world frame at time t. For appropriate conversions, reference is made to the above described *Design and Error Analysis of Accelerometer-Based Inertial Navigation Systems*, Chin-Woo Tan et al. publication, particularly Equation 2.7 on page 6 wherein it is set forth that accelerometer outputs are a function of linear acceleration in the world frame and angular acceleration in the body frame. The application in the above-referenced paper assumes the use of six single-axis accelerometers, but Equation 2.7 can be easily modified to handle one or more gyroscopes instead of accelerometers by directly substituting the observed angular velocities and taking derivatives to calculate angular accelerations. Solving these equations then allows the system to track the position and orientation of a fixed point within the controller over time. All of the self-contained inertial sensors in any of the components in each of the embodiments must be positioned and oriented so as to provide a combination of self-contained inertial sensors feasible to provide outputs sufficient to compute the linear and angular motion of the moving controller as described above. While not all such sensor configurations are feasible, it has surprisingly been found that almost all of the configurations using six accelerometers turn out to be feasible. Thus, the configurations of accelerometer positions and orientations need only be grossly rather than finely adjusted in the formation of the composite game controller.

With respect to the above referenced Tan et al., California PATH Program publication, it should also be noted that the purpose of the present invention is the tracking of motion on centimeter-scale accuracy on a time scale of seconds, rather than on the vehicular scale of the publication: tens of meters scale accuracy on a time scale of tens of minutes.

More specifically with respect to the structures shown in the figures, the advantage of the embodiment of FIG. 1 is that the dongle plug-in represents a practical embodiment of the present invention. As set forth above, a motion sensing dongle 103 is plugged into the expansion port 102 of an existing motion sensing game controller 101. For example, if the motion sensing game controller is a Nintendo Wii Remote™, then the dongle plugs in to its expansion port. This embodiment is commercially feasible since it relies only on one motion sensing game controller with is available to every consumer of a motion sensing enabled games console (e.g. the Nintendo Wii system). A new dongle containing a plurality of self-contained inertial sensors may then be produced at reasonable cost. No special effort is required to extract desirable motion data out of this configuration because of the interconnection into the basic controller, e.g. Wii Remote controller. As will be subsequently described with respect to FIG. 5, the game controller signal that is directed from the controller to the game display will contain the output from the tri-axial accelerometer in the Wii Remote and the correlated output from the plurality of self-contained motion sensors in the dongle.

In accordance with another aspect of the embodiment of FIG. 1, the attached dongle contains enough additional self-contained inertial sensors that when combined with the motion sensing game controller's sensors (e.g., a tri-axial accelerometer), the resulting combination of sensor readings is sufficient to estimate the position and orientation of the controller over time. The dongle alone may not necessarily be enough to fully specify all six variables but by selecting the number of self-contained inertial sensors and their approximate positioning in the dongle, it becomes possible through the attachment of such a dongle to a basic game controller such as a Wii remote to create a composite controller with the ability to track motion and orientation in all six dimensions even though each device has insufficient data individually. Assuming the basic game controller possesses a tri-axial accelerometer, possible embodiments of the dongle would include gyroscopes covering three linearly independent axes, or fewer gyroscopes with additional accelerometers to estimate angular acceleration. If a gyroscope is not available to measure angular velocity around the axis running from the tri-axial accelerometer in the basic controller to the inertial sensors in the dongle, it may be necessary to constrain the user's motion in order to get accurate state estimation, since the accelerometers will be unable to directly detect angular acceleration around this axis. The constraint is passed through by the system to inform any user of the system that they need to limit this movement of their wrist as much as they can.

An alternate embodiment is shown in FIG. 2, where multiple game controllers are combined in order to form a composite controller whose joint sensors provide for the sensing of the total of six linear/angular axes. Additional advantages may be found by including more than two controllers or using more sensors than needed to measure along the three linearly independent linear axes and three linearly independent angular axes. Note that as described in the above embodiment it may still be necessary to restrict the user's motion in some manner if the configuration of the composite controller disallows measurements along one or more of the angular axes. However, if the readings of the sensors are linearly independent the methods described in the Tan et al. publication will be sufficient to solve for all six axes even if only accelerometers are available for use.

One advantage of the embodiment of FIG. 2 is that it may allow construction of the composite controller by the user from existing basic controllers. However, this method would likely then require a per-device calibration process to render the configuration known to the system. This can be implemented by having the user place the composite controller in a series of simple static poses (rather than moving the controller along precise arcs). On a flat surface, the controller is permitted to rest for a few moments with the manufacturer's faceplate of each motion sensing game controller resting on a flat surface (i.e. the y axis of each is aligned with gravity). This simple static process allows tuning of the configuration of the above referenced algorithm so that it aligns more closely with what the user has actually produced. As set forth herein and above in combining accelerometers to provide for the tracking of linear and angular motion, even gross positioning of the accelerometers with respect to one another will provide some level of tracking for these motion attributes. Accordingly, relatively gross levels of accuracy of accelerometer alignment may be enhanced by domain-level feed-back into the system which help dampen the errors in positioning that may eventually accumulate. Accordingly, it becomes possible to extrapolate acceleration reading accuracy to compensate for only educated guesses as to the optimum positioning of the controllers.

The above general algorithm may be extended to report results only at the end of one or more repeated motions, wherein each motion starts with identical initial constraints, and follows essentially the same track in time and space, with final velocities and accelerations being zero. Let m>=d1, be the number of those repeated motions. Final motion track estimation may then take as input all m solutions over time, as well as optionally all m sets of data of time series sensor readings, for linear and angular accelerations for the controller and output one final solution which is computed as a function of the m inputs.

Further, the algorithm may be extended to use accelerometer-based motion recognition to constrain which repeated motions are acceptable as inputs to this final motion track estimator. Since each controller of this invention provides a motion signal, through appropriate training or calibration sessions with the proposed user, the gestures may be classified as to their provision of acceptable motion signals. Then, motions that are significantly different from the original can be identified and removed from the aggregation process described above.

The algorithm may be extended to inform the system when the controller has accumulated so much error that it is no longer providing reasonable tracking information. The algorithm may also be extended with additional assumptions such as that the computed velocities are not permitted to exceed human limitations at any point in time t, and along any axis.

Figure 5:
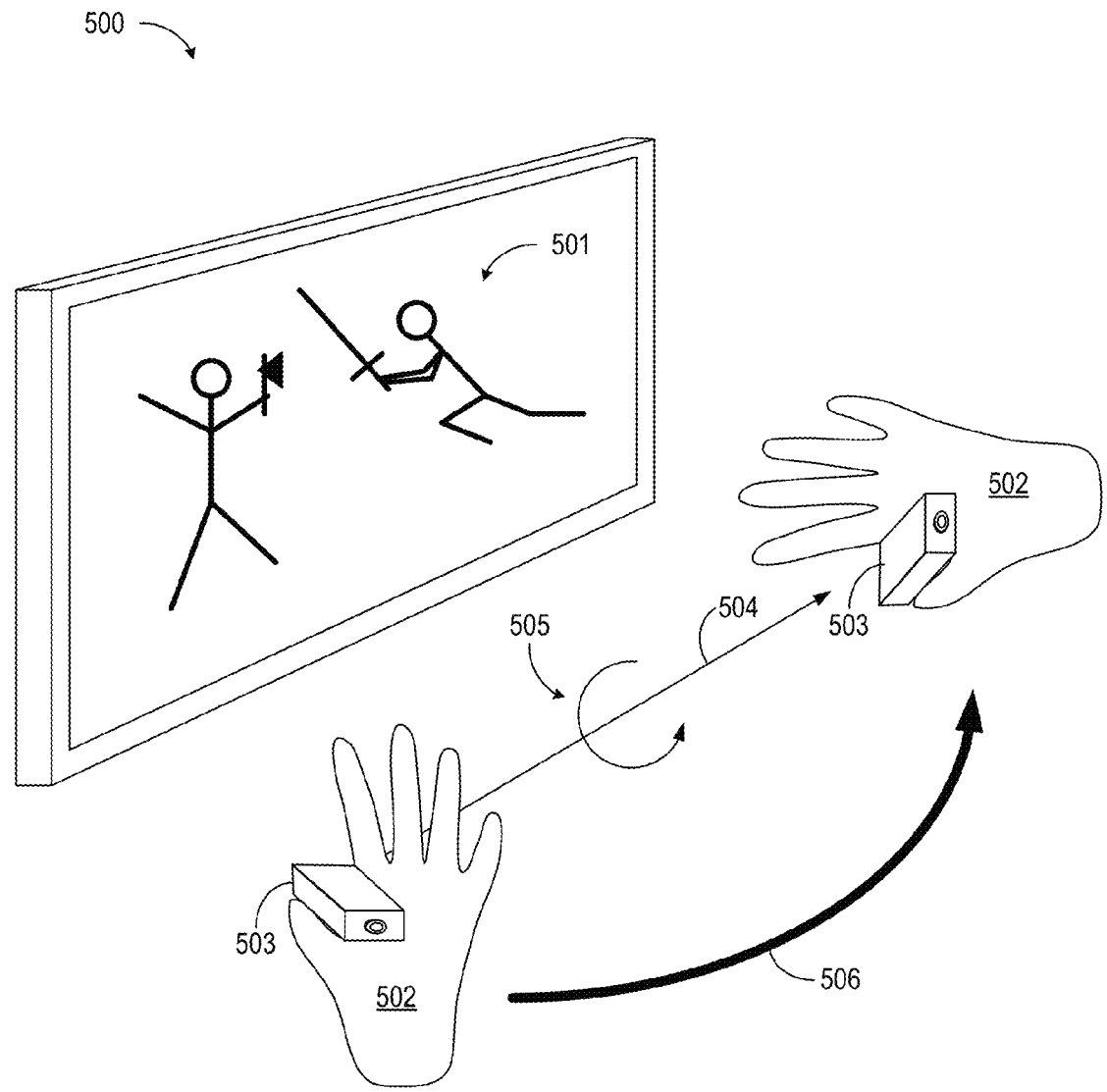
FIG. 5 is an illustrative diagram showing the three dimensional linear motion and angular orientation of the sensed handheld wireless game controller with respect to a displayed computer game.

FIG. 5 is a simple diagrammatic illustration of what has been described with respect to the apparatus of FIGS. 1-4. Computer controlled interactive game display 500 has game action 501 which is controlled by a game controller 503 which may preferably be a composite controller in accordance with the present invention carried along some path 506, which has a linear component 504 and an angular component 505, by a player's moving hand 502.

The programming in the computer controlled display 500 and in the handheld controller 503 assumes that the player holds the controller in some starting position and then as the player moves the controller the programming is able to estimate the relative position and orientation of the controller 503 reliably for several seconds. During that time, a game 500 is able to draw 501 a representation of the controller's state. Known techniques, such as inverse kinematics, allow the state of the controller to drive an animation in a game. For example, a game character could swing a virtual sword in a manner that is similar to the way the player swung the physical controller.

The location of the game, i.e. the limits of the controller 503 movement with respect to the game display 500, is arbitrary and domain-dependent. Preferably there is a radius around initial location of the game display which is about the operational range of most game controllers.

Referring now to FIG. 6, there will be described a generalized flowchart of the programming in the operation of the invention using a game controller for a computer controlled game display, as has been described with respect to FIG. 5.

An initial determination is made as to if the user has started the controller motion, step 601. In regard to the initial state of the controller, the following constraints are suggested: initial velocities and accelerations are zero. If the initial determination of motion is "Yes", then the readings from all the sensors in the controller must be obtained. In the case of a composite controller, this includes all sensor readings from the basic controller as well as all reading from any sensors associated with other components that comprise the composite controller. Typically, the sensor values are read at some suitable high frequency and, at an appropriate point consistent with the computer game being played, the data from the sensor readings is output to the computer controlled game display via the previously described short range RF transmission, step 602. Note that, transmission of the sensor readings data typically occurs hundreds of times a second whenever the controller and computer controlled game display are turned on. So step 602 merely implies that the computer controlled game display will start to process those readings in a manner consistent with the invention. Next, the processor associated with the computer controlled game display executes step 603 in which the angular motion is extracted from the sensor readings. This step will depend on the particular configuration of sensors used. For example, if three gyroscopes are used, then the gyroscopes will provide readings of angular velocity which can be integrated once to obtain the relative angular motion, i.e. the change in orientation. If accelerometers are used instead, then the readings will provide angular acceleration which can be integrated twice to obtain the relative angular motion. Of course, gyroscopes could be used for some angular axes and accelerometers for others, in which case step 603 will perform the appropriate action of integrating once for readings from gyroscopes and twice for readings from accelerometers. The change in orientation calculated in step 603, is then used in step 604 to update the previous orientation estimate by adding in the change in orientation. The sensor readings not used in calculating the angular motion are then extracted from the sensor readings data, step 605. Typically, the remaining sensor readings will be from accelerometers and the estimate of the angular motion from step 603 can be factored out of those accelerometer readings, step 606, to leave the accelerations due to linear motion along all three linear axes, i.e. the change in position. Then the position of the controller can be updated, step 607, using the estimated change in position calculated in step 606. As the controller continues to be moved, a determination is made as to whether the movement is being continued, step 608. If Yes, the process is returned to step 602, and movement tracking is continued. If No, a further determination is made as to whether the game is over, step 609. If Yes, the game is exited. If No, the process is branched back to step 601 wherein the player's next controller movement is awaited.

Referring now to FIG. 7, there will be described an overview of one way of using the software elements.

The left hand side shows the situation at a first time 706. The right hand side shows the situation at a second time 707.

At a first time period 706 (shown in FIG. 7 as the past), a game player 702 is holding a self-tracking object 703. The output from the self-tracking object 703 is being communicated to a game console 704, wirelessly or by some other technique. The game console 704 operates in conjunction with a game. The game is presenting a depiction of a game world (such as a made-up, fictional, world) on a display or other presentation device 720.

At a second time period 707 (shown in FIG. 7 as the present), the player performs a gesture or other motion 711 with the self-tracking object 703. The motion 711 includes a translational component 712 and a rotational component 713, as a result of which the device is moved from the first configuration 708 at the first time period 706 to a second configuration 714 at the second time period 707. In response to the motion 711, the self-tracking object 703 generates one or more time series of data, those one or more time series data being descriptive of the motion 711.

Software elements 705 being executed on the game console 704, or being executed on another device and accessible by the game console 704, interpret at least some of the time series of data generated by the self-tracking object 703 in response to the motion 711, and cause the presentation device 720 to display a corresponding animation of an object corresponding to the self-tracking object 703 (such as some fictional character in the game world) moving from a first configuration 715 to a second configuration 716. In one embodiment, those software elements 705 use methods as described herein to create a more faithful corresponding animation of that motion than would otherwise be possible.

Referring now to FIG. 8, there will be described a backfitting algorithm, as used in one embodiment, applied to a self-tracking object.

In a most general case, the motion takes place in three dimensions, with three degrees of translational freedom and three additional degrees of rotational freedom. For expository purposes, and for ease of representation on a 2-dimensional page, the description below relates to a 2-dimensional motion 811. However, the description below of the 2-dimensional case is more than adequate to illustrate how the method is applied to a 3-dimensional motion 811. Accordingly, those skilled in the art would easily understand from a description of the method with respect to a 2-dimensional motion 811, how to apply the same method with respect to a 3-dimensional motion 811.

A motion 811 starts with a self-tracking object, such as the motion sensitive device 703 shown in FIG. 7, in some first configuration in which the position 801 and the orientation 802 are known, or at the least, assumed to be known. Methods for inferring the initial configuration of the object are described in greater detail below. In one embodiment, the orientation 802 of the self-tracking object is inferred from accelerometer readings that, during momentary periods of quiescence, indicate the direction of gravity relative to the self-tracking object. The software elements 705 determine, in response to sensor readings from accelerometers and gyroscopes, whether a period of quiescence is taking place. In one embodiment, the origin is set to the location of the self-tracking object.

In alternative embodiments, information from a direct pointing device may be used to infer information about the initial configuration. For example, the self-tracking object might include a laser pointer which the player might orient by directing that laser pointer at the presentation device 820, or some other device whose location is known to the software elements 705. Those skilled in the art would recognize that a variety of other and further possible sensors, assumptions, or both sensors and assumptions, may be used to obtain information regarding a starting configuration of the self-tracking object.

As the self-tracking object moves, the software elements 705 integrate and combine gyroscope and accelerometer readings to provide estimates of changes in the self-tracking object's time-varying configuration. The following equations show simplified example computations:

$$\text{orientation}(t+dt) = \text{orientation}(t) + \text{Gyro}(t) * dt \quad (1)$$

$$\text{velocity}(t+dt) = \text{velocity}(t) + (\text{orientation}(t) * (Acc(t) - \text{(Centripetal Accelerations from rotation at time } t)) - \text{Gravity}) * dt; \quad (2)$$

$$\text{position}(t+dt) = \text{position}(t) + \text{velocity}(t+dt) * dt \quad (3)$$

In equation (1) above, $\text{Gyro}(t)$ includes three orthogonal readings of angular velocity at time t. Multiplying by dt, the time elapsed since the previous readings, gives the angular change around each axis since the previous readings. This change can be applied to the previous estimate of orientation. Embodiments for making these computations depend on the form in which the orientation information is stored. In the games industry, quaternions are commonly used for this purpose, in which case the angular change from the $\text{Gyro}(t)*dt$ term can be converted to a quaternion rotation and added using quaternion arithmetic.

In equation (2) above, $Acc(t)$ includes three orthogonal readings of acceleration at time t in the frame of reference of the object. If the accelerometers are not physically co-located with the gyroscopes, the computation first subtracts any accelerations resulting from the accelerometers rotating around the location of the gyroscopes. For example, if the accelerometers are displaced along the z-axis of the object, the following adjustments would need to be made to the accelerometer readings: Since $Acc(t)$ and $\text{Gyro}(t)$ are vectors [0], [1], and [2], and are used to refer to their individual scalar components.

$$\text{Increase } Acc(t+dt) \text{ by } AA*z\text{Offset} - (\text{Gyro}(t+dt)*\text{Gyro}(t+dt))*z\text{Offset} \quad (4)$$

$$\text{Increase } Acc(t+dt) \text{ by } -AA*z\text{Offset} - (\text{Gyro}(t+dt)*\text{Gyro}(t+dt))*z\text{Offset} \quad (5)$$

$$\text{Increase } Acc(t+dt) \text{ by } (\text{Gyro}(t+dt)2 + \text{Gyro}(t+dt)2)*z\text{Offset} \quad (6)$$

where $$AA = (\text{Gyro}(t+dt) - \text{Gyro}(t))/dt \quad (7)$$

$$AA = (\text{Gyro}(t+dt) - \text{Gyro}(t))/dt \quad (8)$$

The adjusted accelerometer readings are translated from the object frame to the world frame using the current orientation of the object. Acceleration due to gravity (approximately 9.8 m/s/s on planet Earth's surface) is subtracted. The changes in each of the three dimensions of the object position can be found by multiplying by dt*dt.

With these or equivalent computations, the software elements 705 can generate estimates of position and orientation, as indicated by the dotted line 803. Due to the accumulation of errors in sensor readings, e.g., caused by noise, limited precision, or other factors, or possibly due to errors in transmission of the time series data, the actual position and orientation of the self-tracking object are likely to generate a set of estimates of position and orientation 805 that differ at least somewhat from reality. Over time the difference can become sufficient to be relevant to operation of the game console 704 and the game. For example, the difference might become large enough that an animation generated by coupling the inferred position and orientation estimates might appear more and more unrealistic to the player as time progresses.

From time to time, the software elements 705 receive additional information regarding position and orientation of the motion sensitive object 703 that becomes available at an identifiable time, with the effect that software elements 705 are able to determine a new instantaneous position 806a and orientation 806b. For a first example, this can happen if the player stops moving the motion sensitive device 703, with the effect that an identifiable period of quiescence is entered. For a second example, the software elements 705 might receive readings from other sensors, such as a pointing device as described above, with the effect that at least some subset of the new instantaneous position 806a and orientation 806b can be more precisely inferred at that time. Some examples of computing these new estimates of configuration are described below.

When more precise information, or other corrective information, becomes available the inventors have discovered that the information can be used for more than just obtaining more reliable estimates at that moment in time. In particular, the information can be used to infer something about the errors over at least some portion of the recent history of sensor readings. By taking those error estimates into account, a new trajectory can be calculated, as shown as the solid line 804 in FIG. 8. The new trajectory 804 may still not be a perfect reflection of the actual trajectory of the self-tracking object, but the inventors have found it to be a more accurate and useful one than just the original estimate. In particular, it can be used to drive an animation that, although delayed, appears as a more accurate rendition to the player of the motion 811 just performed.

In one embodiment, computation of the re-estimated trajectory includes the following elements and steps:

Computation of the re-estimated trajectory draws primary attention to two categories of errors. A first category includes errors that are essentially random in their effect on the sensors at different times. Such errors might be in response to noise in reporting of the sensor readings, truncation errors in reporting of the sensor readings due to limited precision, and the like. For one example, if gyroscope readings are reported as 8-bit values, this would have the effect of essentially random errors—the differences between the true values and the values that are rounded to this limited precision. A second category includes errors that are systematic, i.e., when a particular sensor has its data affected in a substantially consistent way over time. Such errors might be in response to miscalibration of that sensor (e.g., the sensor data reported for a true value of zero might be miscalibrated to a finite nonzero value).

Computation of the re-estimated trajectory first addresses errors in orientation. Labeling the initial position for this segment of the motion time as t.sub.0 and assuming k updates at times t.sub.1 to t.sub.k inclusive, the predicted orientation at time t.sub.k will be $$\text{orientation}(t_o) + \Sigma_{i=1 \; to \; k} \text{Gyro}(t_i) * (t_i - t_{i-1}) \quad (9)$$

The predicted orientation can be forced to match the target orientation by adjusting each $\text{Gyro}(t_1)$ by $(\text{tgtOrient} - \text{orientation}[t_k])/(t_k - t_0) * (t_i - t_{i-1})$.

The computation allocates these adjustments to the two sources of error described above. Viewing the category of random errors as a random walk of k steps, there should be a typical deviation of $\text{sqrt}(k) * \text{err}\langle\text{sensor}\rangle$, where $\text{err}\langle\text{sensor}\rangle$ is the typical error for that sensor on an individual reading. This value can be determined by experimental analysis. The remaining error, if any, can be assumed to be an offset error on the gyroscopes and applied to future readings. In one embodiment, it might be desirable to limit the maximum corrections that are applied to attribute any residual corrections to further-unknown factors.

The computation applies a similar procedure to adjust the accelerometer readings using the new estimates of orientation during the updating of position. The procedure for position is somewhat more complicated since the adjustments applied to accelerometer readings will have different effects on the final position depending on the orientation of the sensor at the time. First, the computation assumes that the new adjusted orientations and centripetal accelerations are correct. The computation can then calculate the effect of each of the three accelerometer readings on each of the three components of position for each step, using equations (2) and (3) above. This has the effect that, for time $t_k$ $$\text{position}(t_k)[j] = \text{position}(t_0)[j] + \text{velocity}(t_0)[j] * (t_k - t_0) + \Sigma_{i=1 \; to \; k} \varnothing * \text{Acc}(t_i) * (t_i - t_{i-1}) * (t_i - t_i) \quad (10)$$

for each of the three components j of position where $\varnothing$ is a vector indicating the effect that each component of $\text{Acc}(t_i)$ has on component $j$ of velocity given the orientation $(t_i)$.

This equation governs how changes in the Acc readings will affect the final position. The computation solves to find the minimum adjustments to make to Acc in order to match the target position. In response to these adjustments, the computation can divide them between noise and offset errors, using the method described above.

The process of re-estimation, or backfitting, is not restricted to occurring just once at the end of a motion 811. Whenever extra information becomes available during the course of a motion 811, however short or long, that extra information can be incorporated as a resynchronization and re-estimation step for the current motion 811 and any past portions thereof. It can also be used going forward to more reliably estimate any errors that might otherwise be introduced by the motion sensing device 703. Line 808 shows a first position and orientation path generated by the software elements 705 using a first set of estimation parameters. Line 807 shows a second position and orientation path generated by the software elements 805 using a second set of estimation parameters, after incorporating new information as described above, and after re-estimating the position and orientation path shown by line 808. This process can be applied repeatedly and iteratively, with the effect that the software elements 705 might accurately determine relatively longer sequences of faithful tracking of the motion 811.

The computation described above uses information about the target configuration to adjust the estimated trajectory and sensor errors. In alternative embodiments, the computation may use information about target velocities. In such cases, the computation uses a symmetric procedure obtained by substituting equation (11) below for equation (10) above.

$$\text{velocity}(t_k)[j] = \text{velocity}(t_0)[j] + \Sigma_{i=1} \varnothing * \text{Acc}(t_i) * (t_i - t_{i-1}) \quad (11)$$

Referring now to FIG. 9, there follows a description of a data flow diagram 900 of information flow in a game control system.

A self-tracking object 917 provides a set of raw sensor readings 902, which are received from the self-tracking object 917 by device driver 901. The device driver 901 applies hardware calibration steps to produce a set of calibrated sensor readings 908. Techniques for hardware calibration are known to those skilled in the art and include, for example, (a) modifying the raw sensor readings 902 according to known or calculated temperature variations, and (b) compensating for errors that may have been introduced in the manufacturing process of the self-tracking object 917. Manufacturing errors might be detected in a calibration step performed in the factory when the self-tracking object 917 is manufactured.

In one embodiment, the game 911 will formulate assumptions 910 about the initial configuration of the self-tracking object. These assumptions can include assumptions that the software elements 705 should make about the initial configuration of the object. For example, the game 911 might supply one or more components of the initial position or orientation of the object.

A configuration initiator 909 receives those assumptions 910 supplied by the game 911. From those assumptions 910, the configuration initiator 909 determines an initial configuration that will be used by the tracker 918.

In one embodiment, the game 911 provides an initial position for the object and an assumed value for the rotation of the object around the axis corresponding to gravity, here labeled the z-axis. The other two components of the orientation can be computed by the configuration initiator 909 in response to readings from the inertial sensors. This computation can be performed when the object is at rest.

In one embodiment, the configuration initiator 909 can use information from the sensors to infer whether the device is currently in motion. For example, if the self-tracking object 917 can be assumed or detected to be still, gravity readings can be used to infer orientation information. When the device is relatively motionless, the gyroscope readings will all be close to zero and the acceleration reported by the sensors should be due almost entirely to gravity. In such cases, the accelerometer readings should be consistent over time and have a norm approximating an acceleration of one gravity (approximately 9.8 m/s/s). When these conditions are substantially met, the configuration initiator 909 determines that the object is substantially at rest.

The configuration initiator 909 can determine two components of orientation by finding the necessary rotations in the world frame in order to align the accelerometer readings entirely along the z-axis. In one embodiment, the configuration initiator 909 determines a set of rotations to align the axis with the largest accelerometer reading. This computation might be performed as shown in the following pseudo-code:

```
if largestAxis is Positive X                                    (12)
    largeRot[Z] = M_PI/2; largeRot[X] = M_PI/2;
else if largestAxis is Negative X
    largeRot[Z] = -M_PI/2; largeRo[0]t = M_PI/2;
if largestAxis is Positive Y                                    (13)
    largeRot[Z] = M_PI; largeRot[0] = M_PI/2;
else if largestAxis is Negative Y
    largeRot[Z] = 0; largeRot[0] = M_PI/2;
if largestAxis is Positive Z                                    (14)
    largeRot[Z] = 0; largeRot[0] = M_PI;
else if largestAxis is Negative Z
    largeRot[Z] = 0; largeRot[0] = 0;
set initialOrientation using largeRot;                          (15)
gravReading = initialOrientation*Acc;                           (16)
rotX = -atan(gravReading(Y)/tmpReadings(Z) );
    adjust initialOrientation by rotating an additional rotX around  (17)
    the X axis
gravReading = initialOrientation*Acc;                           (18)
rotY = atan(tmpReadings(X)/tmpReadings(Z) );
    adjust initialOrientation by rotating an additional rotY around  (19)
    the Y axis
```

The configuration initiator 909 sets the remaining component using input from the game. In one embodiment, the configuration initiator 909 presumes the rotation around the z-axis is zero.

If other sensor readings are available, for example from a pointing device as described above, the configuration initiator 909 might use these other sensor readings to determine information about the initial configuration.

Initially, the tracker 918 assumes that the current configuration is the initial configuration 912. As time passes, the tracker 918 determines the current configuration by applying changes to the initial configuration in response to calibrated sensor readings 908.

In one embodiment, the sensors in the self-tracking object 917 include gyroscopes and accelerometers sufficient to track changes in position and orientation of the self-tracking object 917. As described above, the software elements 705 integrate and combine gyroscope and accelerometer readings according to known principles.

Depending on the accuracy and resolution of the sensors in 917, known techniques are unlikely to be sufficient to produce reliable configuration estimates for use in one embodiment of computer games. The inventors have therefore discovered techniques that significantly improve the reliability of the estimates and are therefore an enabling technology for a new class of applications.

In one embodiment, the tracker 918 applies constraints to the calibrated sensor readings 908. These constraints include clamping the readings to allowable ranges, clamping values calculated from the readings to known ranges, introducing a drag term, or requiring a minimum impulse to act as a threshold to avoid misinterpreting hand tremors as significant motion.

Once the tracker 918 has constrained the calibrated readings, it uses known techniques, from the art of inertial guidance and related fields, to generate a configuration estimate 905. The configuration estimate is sent to a corrector 907 that adjusts the estimate to produce a corrected estimate 916. In one embodiment, the corrections are dynamically calculated using the backfitting algorithm described above, stored 903 and periodically updated 906. Examples, not intended to be limiting in any way, of corrections include:

The tracker 918 might partially determine constraints on motion of the self-tracking object 917 by presuming that the self-tracking object 917 follows motions restricted by a mechanical model of a human figure. For example, if it is known that a position estimate would violate an assumption about limb length, such as a motion that would only occur if the game player's arm would bend unrealistically, the estimate 905 can be corrected accordingly.

In one embodiment, the tracker 918 might make estimates for position and orientation of a model of the figure of the human being as that person is moving the self-tracking object 917. For example, the tracker 918 might determine an estimate of the position and orientation of the arm, shoulder, and hand holding the controller of that human figure, at each time step in a periodic (or otherwise defined) time sequence. This would include estimating angles for each relevant joint of the human body as well as, possibly, extensions of musculature, collectively referred to herein as "poses", using, e.g., known techniques for inverse kinematics such as those described in R. FEATHERSTONE, ROBOT DYNAMICS ALGORITHMS.

In such embodiments, the tracker 918 would examine each such estimated pose and adjust its estimates for the likelihood of the estimated pose (in addition to or in lieu of adjusting its estimates for the likelihood of the estimated position and orientation of the self-tracking object 917). Likelihood of any particular estimated pose might be determined using (a) information about human physiology, e.g., how elbows, shoulders, wrists, and the like, are able to rotate, and (b) information about the particular application in which the self-tracking object 917 is being used as a controller.

For example, in embodiments in which the self-tracking object 917 is being used to simulate a baseball bat, e.g., a sports game, the tracker 918 can evaluate the likelihood of particular baseball-bat-swinging motions, and assign poses relating to those swinging motions in response to their likelihood if performed by a baseball-bat-swinging player. This would have the effect that poses in which the baseball-bat-swinging player contacts an (imaginary) baseball have greater likelihood than otherwise. Moreover, the tracker 918 can take advantage of one or more simplifying assumptions, e.g., that the baseball-bat-swinging player is standing relatively still and upright while swinging the self-tracking object 917 with a two-handed grip.

In such embodiments, when the tracker 918 encounters an estimated pose (or sequence of poses) that it deems unlikely—either given human physiology or the nature of the information about the particular application in which the self-tracking object 917 is being used as a controller—the tracker 918 can (a) adjust that estimated pose or sequence of poses to one that is more likely, and (b) re-estimate the motion of the self-tracking object 917, and consequentially the pose or sequence of poses, to conform with that adjustment.

In alternative embodiments, it might occur that an explicit model of poses for the figure of the human being, as that person is moving the self-tracking object 917, might not be necessary. In such cases, the tracker 918 may use logical assumptions about motions of that human being to determine whether any particular pose, or sequence of poses, is likely or unlikely. For example, if the human being is—by the nature of the application—assumed likely to be standing in a relatively fixed location, any reported or estimated position of the self-tracking object 917 too far from that relatively fixed location may be adjusted in response to that distance. This has the effect that any reported or estimated position of the self-tracking object 917 would be substantially constrained to remain within a box or sphere surrounding the human being's initial position and limited by that human being's typical physical reach.

The tracker 918 might, from time to time, detect the angular orientation of the self-tracking object 917 with respect to gravity, i.e., from what angle from "up" or "down" the self-tracking object 917 is instantaneously pointing. For example, if the self-tracking object 917 enters a quiescent state, the angular orientation of the self-tracking object 917 can be adjusted accordingly.

The tracker 918 might, from time to time, assume that the self-tracking object 917 is in a period of likely quiescence, such as for example when the game indicates that there is nothing for the game player to do, and the game player is thus likely to not be moving the self-tracking object 917. If the tracker 918 is able to detect a period of likely quiescence, the relative velocity and angular velocity of the self-tracking object 917 can be determined, and parameters describing the position and orientation of the self-tracking object 917 can be adjusted accordingly.

The tracker 918 might, from time to time, receive data from the user, such as a game player, indicating information the user supplies that can be used to aid in determining the position and orientation of the self-tracking object 917.

For a first example, if the user pushes a button on the self-tracking object 917 in an application in which that button is used to simulate a gun (e.g., a "first-person shooter" game), the tracker 918 might use the timing of that button-press to restrict the set of possible positions or orientations of the self-tracking object 917, e.g, to those in which the self-tracking object 917 is oriented so that the simulated gun is actually pointed toward a target. For a second example, if the user enters text data using a console associated with the self-tracking object 917, the tracker 918 might use that text data (or use the fact that such text data is being entered) to restrict the set of possible positions or orientations of the self-tracking object 917, with the effect that the tracker 918 might adjust its determination of position and orientation of the self-tracking object 917 accordingly. The tracker 918 might, from time to time, receive input values from additional sensors, such as for example a light pen, infrared remote sensor, or other indicator of the orientation of the self-tracking object 917. The tracker 918 might use those values from additional sensors to restrict the set of possible positions or orientations of the self-tracking object 917, with the effect that the tracker 918 might adjust its determination of position and orientation of the self-tracking object 917 accordingly.

The corrected estimate 915 can then be further corrected based on in-game constraints and assumptions. Examples, not intended to be limiting in any way, of in-game corrections include:

The tracker 918 might determine constraints on the position and orientation of the self-tracking object 917 according to restrictions it believes on the set of possible final configurations of the self-tracking object 917 at the end of a motion. For example, if the end of a motion (or any part of a motion) would place the self-tracking object 917 in the same spatial location as the user's head or body, or in the same spatial location as a wall or the game controller itself, the tracker 918 might restrict the set of possible positions and orientations of the self-tracking object 917 to exclude that possibility, and adjust its determination of the position and orientation of the self-tracking object 917 accordingly.

The tracker 918 might apply game constraints to the set of possible motions of the self-tracking device 917, such as if the self-tracking device 917 is being used by the game player to emulate a particular type of object (e.g., to use a sword in a fantasy game, or to use a golf club in a sports game). The tracker 918 might therefore restrict the set of possible motions, and therefore changes in relative position and orientation of the self-tracking device 917, accordingly.

For a first example, in an application in which the self-tracking object 917 were used to simulate a sword (e.g., a fantasy role-playing game), the tracker 918 would be able to restrict the possible motions of that simulated sword so that it cannot pass through, or terminate its motion in, certain types of objects in the game word, e.g., solid walls or other swords.

For a second example, in an application in which the self-tracking object 917 were used to simulate a baseball bat in a baseball game, the tracker 918 would be able to restrict the possible motions of that simulated baseball bat so that it remains in or near a strike zone in the baseball game. This would have the effects of (a) limiting the scope of possible animation, thus simplifying the task of performing that animation, (b) detecting relatively larger errors in tracking of the self-tracking object 917, and (c) detecting anomalous behavior by the human being, such as if that human being decides to walk away from the simulated batting region.

An application using the self-tracking device 917 might involve use of motion recognition signals, such as for example as described in detail in U.S. application Ser. No.

11/486,997, "Generating Motion Recognizers for Arbitrary Motions". In such cases, the motion recognition signal classifies the movement of the self-tracking device 917 into one (or possibly more than one) of a set of preselected classes of motions.

For one example, in an application in which the self-tracking device 917 is used to simulate one or more kitchen utensils (e.g., a game, simulation, or teaching environment relating to cooking), the tracker 918 might use a motion recognizer that classifies motions by the self-tracking device 917 into known gestures used in those environments, e.g., frying, flipping, chopping, pounding, and the like. An arbitrary motion by the human being holding the self-tracking device 917 would be classified into one or more of these known gestures, with the effect of providing a motion recognition signal assigning the motion to one or more of those known gestures.

In various embodiments, the motion recognition signal might (a) uniquely classify the motion as a particular gesture, (b) classify the motion as one of a set of possible gestures, (c) associate the motion with a probability or other score of being each one of those possible gestures, and the like.

The tracker 918 can use the knowledge it obtains from the motion recognition signal—assignment of the motion to a particular class of gestures—to restrict the set of possible estimates of position and orientation of the self-tracking device 917 to those consistent with the motion recognition signal.

For example, not intended to be limiting in any way, if the motion recognition signal indicates that the self-tracking device 917 (simulating a frying pan) has just been used to flip an omelet, any sensor readings or time series data received from the self-tracking device 917 inconsistent with that gesture (e.g., motions more likely to be associated with chopping vegetables or pounding meat), might be deemed more likely to be erroneous, unintended or insignificant. The tracker 918 might then dampen use of those sensor readings or time series data, with the effect of improved, or at least more consistent, estimation of position and orientation of the self-tracking device 917. Moreover, if the inconsistent motions resulted from unconscious or unintended movement by the human being holding the self-tracking device 917, the tracker 918 would be able to provide that human being with a perception of improved tracking.

In various embodiments, the motion recognition signal might provide additional information relating the motion to particular gestures, such as possibly (a) an evaluation of a measure of distance between that motion and each classified gesture, or (b) an evaluation of a measure of distance between that motion and particular prototypes within particular classes of gesture.

For example, not intended to be limiting in any way, if the motion recognition signal indicates that the self-tracking device 917 (simulating a frying pan) has just been used to flip an omelet, but that there is a reasonable alternative interpretation that the self-tracking device 917 (simulating a sharp knife) has just been used to chop vegetables, the tracker 918 might use the ambiguity between these possibilities to choose to be less aggressive about dampening use of those sensor readings or time series data that are ambiguous.

In one embodiment, a canonical animation might be associated with each particular gesture, with the effect that the animation actually presented in response to a particular motion might be a blend of the estimated actual motion of the self-tracking device 917 and of the canonical animation assigned to the detected-and-classified gesture. In some applications, this would allow the tracker 917 to perform a "snap to fit" function, i.e., to present the actual motion in (one of) the way(s) the gesture should ideally be performed, rather than the approximation actually performed by the human being. In alternative embodiments, the presented animation may be a weighted blend of canonical animations associated with those more than one classes of gesture the motion was detected-and-classified to be. Relative weights of that blend might be responsive to the measures of distance to each class, to the probabilities associated with each class, and the like.

Similarly, a canonical animation might be associated with each particular prototype within a particular gesture class. In such cases, the animation actually presented in response to a particular motion might be (a) a blend of the canonical animations associated with those prototype gestures, (b) snapped to fit a selected one of the canonical animations associated with those prototype gestures, (c) a blend of the canonical animations associated with one or more of those prototype gestures and the actual motion of the self-tracking device 917. In each such case, weights associated with each possibility for the blend might be responsive to measures as described above.

The tracker 918 might from time to time, receive DPD (direct pointing device) readings, such as for example determining that the self-tracking object 917 is aligned in a known orientation from alignment of the self-tracking object 917 with a set of LEDs or other electromagnetic or sonic alignment elements. The tracker 918 might use those DPD readings to restrict the set of possible positions or orientations of the self-tracking object 917, with the effect that the tracker 918 might adjust its determination of position and orientation of the self-tracking object 917 accordingly. The tracker 918 might, from time to time, presume that the self-tracking object 917 is no longer moving, such as for example when the game controller indicates that there is no action for the user to take. The tracker 918 might use that assumption to restrict the set of possible positions or orientations of the self-tracking object 917, with the effect that the tracker 918 might adjust its determination of position and orientation of the self-tracking object 917 accordingly.

The game corrected estimate 912 is communicated back to the game where it is typically used to drive an animation that is intended to correspond to the motion of a game element corresponding to the self-tracking object 917. For example, if the game element is a sword (in a fantasy game), or a golf club (in a sports game), a presentation would be made of that game element moving in accordance with the way the user moved the self-tracking device 917.

In one embodiment, the tracker 918 assumes a one-to-one mapping of the self-tracking object 917 to motion of a simulated object in a virtual environment, the latter being presented to a user using animation. In alternative embodiments, other and further mappings are possible, as described below.

In one set of alternative embodiments, the virtual environment might determine a force or other motive power in that virtual environment, in response to changes in position or orientation of the self-tracking object 917. For example, a sharp change in position or orientation of the self-tracking object 917 might be interpreted as a directive to impart a throwing or maneuvering force on an object in that virtual environment. In such examples, the virtual environment would (a) determine an amount of force to apply, (b) in response thereto, determine a set of changes in position or orientation of that object in that virtual environment, and (c) in response thereto, determine an animation of that virtual environment including that object.

Examples of such action in response to changes in position or orientation of the self-tracking object 917 include:

the self-tracking object 917 might be used to simulate a throwable object—e.g., a baseball—in the virtual environment, with changes in position or orientation of the self-tracking object 917 being used to determine how hard and in what direction that object is thrown (e.g., the user might pretend to throw a baseball using the self-tracking object 917 to simulate the baseball, being careful of course not to actually throw the self-tracking object 917 at the game controller, unless that self-tracking object 917 is padded or otherwise secured to allow for actual throwing);

the self-tracking object 917 might be used to simulate a tool for striking or throwing—e.g., a baseball bat—in the virtual environment, with changes in position or orientation of the self-tracking object 917 being used to determine a force or other motive power in that virtual environment, with that force being used to determine how hard and in what direction an object is struck (e.g., the user might pretend to hit a baseball with a baseball bat using the self-tracking object 917 to simulate the baseball bat;

similarly, the self-tracking object 917 might be used to simulate a tool in the virtual environment, such as a light switch or a trigger of a gun, with the effect that changes in position or orientation of the self-tracking object 917 would be interpreted by that virtual environment to indicate that sufficient force had been applied in that virtual environment to switch on a light or fire a gun.

In one set of alternative embodiments, a viewpoint (such as a viewpoint of a user or of a camera) in the virtual environment might be responsive to changes in position or orientation of the self-tracking object 917. In such embodiments, the user may be allowed to indicate a direction or to select objects in a virtual environment (such as a virtual reality depiction of a possibly-fictional 3D environment). The user might be provided with this capability even in circumstances where the user's view is otherwise obstructed in the virtual reality depiction. (1) For one example, the user might be physically holding self-tracking object 917, with the virtual environment simulating an object corresponding to that object. The simulated object, or "CVD" (corresponding virtual device), could be pretty much any object, such as a gun, a whip, a pointing device (e.g., a laser pointer). In the virtual environment, a line segment (or another path) is computed, coupled to the CVD and extending into a region of the virtual environment near the CVD. The computation is based on changes in one or more of position or orientation of the self-tracking object 917, possibly combined with additional information from the virtual environment. This could include setting the direction of the line segment or other path in direct correspondence to the change in orientation of the self-tracking object 917. The line segment might be straight, such as for a laser pointer, or nearly so, such as for a gun (taking into account gravity and windage), or might be deliberately curved, such as for a whip. The computed line segment thus represents a line segment desired by the user. If the computed line segment intersects a object or construct (e.g., a non-physical "object" such as a surface or region) in the virtual environment, e.g., touching a virtual object, plane, or character, the virtual environment determines that the user is deliberately selecting or otherwise indicating that intersected object or construct.

For example, FIG. 10 shows a three-dimensional virtual environment 1000 including various objects 1001 and 1002. A CVD 1005 is a representation of the self-tracking object 917 in the virtual environment 1000. As described above, objects and constructs can be selected using some line segment (or "ray") 1006. As the self-tracking object 917 is moved, thus changing its position or orientation, the CVD 1004 and line segment's new location 1003 allow the user to select a new object 1002. This allows game players in virtual worlds to select objects that are otherwise obscured along their normal viewing plane.

Examples of using this method could include a game player holding a self-tracking object 917 as a controller that corresponds, in a virtual environment, to a gun, flashlight, or whip. The player can then move the controller around to indicate the direction of the gun, flashlight, or flexible cable. Changes in the position or orientation of the self-tracking object 917 could be applied to the corresponding CVD.

In examples in which the self-tracking object 917 corresponds in the virtual world to a gun (or another projectile device, such as a bow), a game player might be taking cover in a virtual environment behind a low wall, as shown on the left-hand side of FIG. 11. Using the technique described above, the game player would lift the self-tracking object 917, causing the CVD gun to move within the virtual environment, and point the CVD gun at an angle down into the area behind the wall, without the game player changing their vantage point, as shown on the right-hand side of FIG. 11.

Similarly, in examples in which the self-tracking object 917 corresponds in the virtual world to a flashlight (or another pointing device, such as a laser pointer), the game player would be provided with the capability for indicating any angle for the CVD flashlight into the screen, and would not be restricted to only those origin points above the viewing plane.

FIG. 12, on the left-hand side, shows an object in the virtual environment obscuring the game player's view deeper into the room. Using the technique described above, the game player would move the self-tracking object 917 to cause the CVD flashlight to illuminate regions behind the obstructing object without requiring any change in vantage point within the virtual environment, as shown on the right-hand side of FIG. 12.

Similarly, in examples in which the self-tracking object 917 corresponds in the virtual world to a whip (or another flexible cable, such as a rope), the game player would be provided with the capability of "reaching around" an obstructing object in the virtual environment, e.g., to thread the cable through a pipe that would otherwise be unseen by the game player. The technique described above allows a game player to indicate direction within a virtual environment using all six degrees of freedom of position and orientation of the self-tracking object 917. This has substantial advantages over known methods of indicating direction.

The process will typically repeat in a game as the player moves the controller around in response to stimuli and instructions from the game.

Referring now to FIG. 13, there follows a description of the control flow in one embodiment.

The game starts and there is some initial period of setup. This setup may include memory allocation and any other well-known steps.

The game then waits for a signal that a button has been pressed on the self-tracking object. Pressing a button is only one example of a starting criteria for tracking to begin. Alternatively the game may signal the start based on internal state and communicate suitable instructions to the player.

Once the game has indicated that it wants to start tracking, the self-tracking object may still not yet be ready to being tracking. For example, in one embodiment, a brief period of quiescence might be required before tracking can begin so the player still needs to hold still for a while after pressing the button. Alternatively, additional sensor readings may be required in order to determine a initial configuration. For example, the player might initially point at a direct pointing device.

Once the tracking can proceed the initial configuration is setup from any information available to the tracker 918.

The tracker 918 then iterates the process described above, in which the tracker 918 (*a*) performs the following: The tracker 918 receives time series data from the self-tracking device 917. The tracker 918 makes estimates of the position and orientation of the self-tracking device 917 in response to those time series data. The tracker 918 receives information allowing it to make a better estimate the position and orientation of the self-tracking device 917. The tracker 918 updates its estimates for the most recent set of historical position and orientation of the self-tracking device 917.

In one embodiment, this process is repeatedly iterated until the tracker 918 receives a signal that tracking can cease. Termination signals could be time based, game event based, or button based.

The tracker 918 continues to make estimates of the position and orientation of the self-tracking device 917, until the game finishes.

Alternative Embodiments

While the preferred embodiments of this invention have been described above, there are many variations which can be understood and derived from the concept and principles set forth.

Such potential variations and embodiments include the following.

In the case of some game controller configurations, clever game design can be used to take advantage of some set of assumptions to give an illusion of enhanced motion tracking. For example, a player may be instructed to hold the controller in a certain way and move along a certain axis. Analysis of the sensor data can then allow a corresponding animation to be rendered. However, this approach has its limitations. If the player violates any of the assumptions, the animation produced will typically not correspond to the actual player's motion.

In some cases, sensor data provided by the controllers of this invention may be analyzed and compared to a provided standard data output that corresponds to specific animations. The animation to which the sensor data is the best match is then selected and played. It is also possible to modify the selected animation based on the degree of correspondence between the sensor data and the best match. For example, if the sensor data indicates that the motion is a faster version of some provided animation, then the animation can be played at a correspondingly faster speed.

Most currently available game controllers do not contain the required six axial accelerometer configuration to fully determine the player's actual motion in a gyroscope-free controller. For example, in some modern game controllers there are only three approximately co-located accelerometers or a single tri-axial accelerometer. Using such controllers to render an animation on the screen that corresponds to a player's motion requires strong assumptions to be made about the player's intended motion. In some cases, this requirement can be mitigated with known techniques. For example, some modern game controllers contain an infrared sensor that when pointing at some direct point device (DPD) provides additional information that can be used to determine more information about player movement. However, the player's movement has to be restricted to a narrow range of motions that keep the DPD within range of the infrared sensor.

The concepts of the present invention may be extended to add more sensors into the system. The above described general algorithm may be extended to such configurations. For example, there could be three motion sensing game controllers have nine accelerometer sensing axes, not just six. The sensing of the three additional axes could provide feedback to be applied to the general algorithm.

Similarly, the general algorithm could be applied to shorten time. There may be many potential competing errors in the system. The samples/sec. may be reduced to limit sensitivity over time, while trading off against integration errors. This in part is based on time scale in which a human movement occurs. Based on the concept of the present invention, a cube with accelerometers placed in a certain configuration on each face can reliably track position and orientation of the controller for longer periods of time. Such a cube could be mounted on a controller, e.g., via an appropriate dongle connection.

In configuring the composite structure of the self-contained inertial sensors, whether in or out of controllers, so as to select the best position and orientation of those sensors to provide a feasible composite controller, additional parameters that describe each sensor and the physical relationship of the different sensors within a sufficiently rigid body must be taken into account. For example, the configuration estimate for the composite controllers in FIGS. 1-3 could include estimates of: the self-contained inertial sensor reading when the device is at rest; the upper and lower range of the self-contained inertial sensor; the sensitivity of the self-contained inertial sensor; how the sensitivity varies with time, temperature, and other conditions; the relative positions of the individual self-contained inertial sensors within the controller; the physical size of the controller; the distance between each controller; the relative orientation of each controller from one another; the relative position of the center of mass of each controller.

What is claimed is:

1. A method for controlling a video game using a wireless game controller, the method comprising:
    sensing linear and angular accelerations of the controller over a broad range of controller motion;
    sensing an electromagnetic alignment element over a narrow range of controller motion, less than the broad range of controller motion, the narrow range limited to an alignment between the electromagnetic alignment element and the controller;
    tracking the sensed linear and angular accelerations to calculate a path of the controller as the controller passes through the broad range of controller motion outside of and including the narrow range of controller motion;
    computing, from the calculated path, an animation path of the controller and driving an animation of an object from the animation path;
    dynamically correcting the animation path responsive to the sensed electromagnetic alignment element as the controller passes through the narrow range of motion; and
    restricting the calculated path based upon a mechanical model of a human figure.

2. The method of claim 1, wherein the linear and angular accelerations include three linear accelerations.

3. The method of claim 2, wherein the linear and angular accelerations include three angular accelerations.

4. The method of claim 1, wherein the calculated path represents the controller motion with centimeter scale accuracy on a time scale of seconds.

5. The method of claim 1, further comprising clamping the calculated path within allowable ranges.

6. The method of claim 1, further comprising correlating the sensed linear and angular accelerations so that both three dimensional linear translation and angular orientation of the moving game controller is tracked with centimeter-scale accuracy on a time scale of seconds.

7. The method of claim 6, further comprising providing a model of a fictional world, the model being responsive to the motion of the game controller.

8. A game system comprising:
an electromagnetic alignment element to emit light;
a motion sensing wireless game controller having:
  a sensor to sense the light from the alignment element over a narrow range of controller motion in which the alignment element is within range of the sensor, the sensor to generate first output responsive to the light over the narrow range of motion;
  an accelerometer to generate second output responsive to linear motion of the controller over a broad range of motion of the controller greater than the narrow range of motion; and
  a gyroscope to generate third output responsive to angular motion of the controller over the broad range of motion;
  wherein the first, second, and third outputs collectively represent controller movement over the broad range of motion; and
a tracker to receive the first output over the narrow range of motion and the second and third outputs over the broad range of motion, the tracker to produce from the second and third outputs game-controller signals that represent position and orientation of the controller over the broad range of motion and outside the narrow range of motion over time;
wherein the tracker, responsive to a controller motion describing a path through the broad range of motion and intersecting the narrow range of motion, dynamically corrects the game-controller signals responsive to the first output while passing through the narrow range of motion.

9. The game system of claim 8, wherein the tracker is part of a game display computer wirelessly coupled to the game controller, the computer to compute an animation path and orientation of the controller and to drive an animation of an object from the animation path and the orientation.

10. The game system of claim 9, the game display computer to provide a model of a fictional world, the model being responsive to the movement of the game controller.

11. The game system of claim 9, the computer to compute data representative of the motion in six degrees of freedom from the game-controller signals.

12. The game system of claim 8, the controller to combine the first, second, and third outputs into data representative of the motion in six degrees of freedom.

13. The game system of claim 8, wherein the tracker resides in the controller.

14. The game system of claim 8, wherein the game-controller signals represent motion of the controller with centimeter scale accuracy on a time scale of seconds.

15. The game system of claim 8, wherein the tracker clamps the game-controller signals within allowable ranges.

16. The game system of claim 8, wherein tracker restricts the game-controller signals based upon a mechanical model of a human figure.

17. The game system of claim 8, the tracker to correlate the second and third output to track both three dimensional linear translation and angular orientation of the game controller with centimeter-scale accuracy on a time scale of seconds.

* * * * *